(12) United States Patent
Kolich et al.

(10) Patent No.: US 8,273,831 B2
(45) Date of Patent: *Sep. 25, 2012

(54) PROCESS TECHNOLOGY FOR RECOVERING BROMINATED STYRENIC POLYMERS FROM REACTION MIXTURES IN WHICH THEY ARE FORMED AND/OR CONVERTING SUCH MIXTURES INTO PELLETS OR INTO GRANULES OR PASTILLES

(75) Inventors: Charles H. Kolich, Baton Rouge, LA (US); John F. Balhoff, Baton Rouge, LA (US); Douglas W. Luther, Walker, LA (US); Robert C. Herndon, Jr., Baton Rouge, LA (US); Ronny W. Lin, Baton Rouge, LA (US); Bruce C. Peters, Baton Rouge, LA (US); Arthur G. Mack, Prairieville, LA (US); David A. Lee, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 775 days.

This patent is subject to a terminal disclaimer.

(21) Appl. No.: 12/373,761

(22) PCT Filed: Jul. 18, 2007

(86) PCT No.: PCT/US2007/073805
§ 371 (c)(1),
(2), (4) Date: Jan. 14, 2009

(87) PCT Pub. No.: WO2008/011477
PCT Pub. Date: Jan. 24, 2008

(65) Prior Publication Data
US 2009/0233097 A1     Sep. 17, 2009

Related U.S. Application Data

(60) Provisional application No. 60/832,184, filed on Jul. 20, 2006, provisional application No. 60/867,548, filed on Nov. 28, 2006.

(51) Int. Cl.
C08C 19/12 (2006.01)
C08F 8/18 (2006.01)
B32B 5/16 (2006.01)
B29C 47/88 (2006.01)

(52) U.S. Cl. ............... 525/355; 525/333.4; 428/402; 264/211.12

(58) Field of Classification Search ............ 428/402; 525/355, 333.4; 264/211.12
See application file for complete search history.

(56) References Cited

U.S. PATENT DOCUMENTS 3,082,816 A  3/1963  Skidmore
(Continued)

FOREIGN PATENT DOCUMENTS

EP  0002514 B2  8/1985
(Continued)

OTHER PUBLICATIONS

Kirk-Othmer, Encyclopedia of Chemical Technology, 4th edition, vol. 19, 1996, Polyesters, Thermoplastics, pp. 609-653.

(Continued)

*Primary Examiner* — William Cheung
(74) *Attorney, Agent, or Firm* — Jeremy J. Kliebert

(57) ABSTRACT

Brominated styrenic polymer is recovered from solution in a vaporizable solvent by converting the solution in a devolatilization extruder into a brominated styrenic polymer melt or flow and a separate vapor phase comprised predominately of vaporizable solvent, recovering the melt or flow from the devolatilization extruder, and allowing or causing the melt or flow to solidify. The solidified brominated styrenic polymer can be subdivided into a powder or pelletized form. Pellets so made have improved hardness and/or crush strength properties along with reduced formation of fines. Brominated anionic styrenic polymer is preferably used in the process.

7 Claims, 4 Drawing Sheets

U.S. PATENT DOCUMENTS

| | | | |
|---|---|---|---|
| 3,692,744 A | 9/1972 | Rich et al. | |
| 3,812,088 A | 5/1974 | Bennett | |
| 4,074,032 A | 2/1978 | Naarmann et al. | |
| 4,110,843 A | 8/1978 | Skidmore | |
| 4,143,221 A | 3/1979 | Naarmann et al. | |
| 4,200,713 A | 4/1980 | Wingler et al. | |
| 4,442,273 A | 4/1984 | Neiditch et al. | |
| 4,452,977 A | 6/1984 | Brasz et al. | |
| 4,808,262 A * | 2/1989 | Aneja et al. | 159/47.1 |
| 4,879,353 A | 11/1989 | Sanders et al. | |
| 4,883,846 A | 11/1989 | Moore et al. | |
| 5,043,421 A | 8/1991 | Golba, Jr. et al. | |
| 5,198,233 A | 3/1993 | Kaiser | |
| 5,378,132 A | 1/1995 | Kaiser | |
| 5,385,994 A | 1/1995 | Graves et al. | |
| 5,391,655 A | 2/1995 | Brandstetter et al. | |
| 5,637,650 A | 6/1997 | Gill et al. | |
| 5,677,390 A | 10/1997 | Dadgar et al. | |
| 5,686,538 A | 11/1997 | Balhoff et al. | |
| 5,717,040 A | 2/1998 | Brandstetter et al. | |
| 5,723,549 A | 3/1998 | Dever et al. | |
| 5,726,252 A | 3/1998 | Gill et al. | |
| 5,728,800 A | 3/1998 | Gottschalk et al. | |
| 5,767,203 A | 6/1998 | Ao et al. | |
| 5,852,131 A | 12/1998 | Balhoff et al. | |
| 5,852,132 A | 12/1998 | Dadgar et al. | |
| 5,902,865 A | 5/1999 | Gausepohl et al. | |
| 5,916,978 A | 6/1999 | Ao et al. | |
| 6,129,873 A | 10/2000 | Shelby et al. | |
| 6,133,381 A | 10/2000 | Reed et al. | |
| 6,207,765 B1 | 3/2001 | Ao et al. | |
| 6,232,393 B1 | 5/2001 | Dadgar et al. | |
| 6,232,408 B1 | 5/2001 | Dadgar et al. | |
| 6,235,831 B1 | 5/2001 | Reed et al. | |
| 6,235,844 B1 | 5/2001 | Dadgar et al. | |
| 6,320,061 B1 | 11/2001 | Collins et al. | |
| 6,326,439 B1 | 12/2001 | Dadgar et al. | |
| 6,365,710 B1 | 4/2002 | Wang et al. | |
| 6,521,714 B2 | 2/2003 | Kolich et al. | |
| 6,657,028 B1 | 12/2003 | Aplin et al. | |
| 6,933,343 B2 | 8/2005 | Ikematsu et al. | |
| 6,992,148 B2 | 1/2006 | Manimaran et al. | |
| 7,202,296 B2 | 4/2007 | Muylem et al. | |
| 7,405,254 B2 | 7/2008 | Muylem et al. | |
| 7,446,153 B2 | 11/2008 | Kolich et al. | |
| 7,585,443 B2 | 9/2009 | Luther | |
| 7,632,893 B2 | 12/2009 | Kolich et al. | |
| 7,638,583 B2 | 12/2009 | Kolich et al. | |
| 7,666,943 B2 | 2/2010 | Reed et al. | |
| 7,666,944 B2 | 2/2010 | De Schryver et al. | |
| 2005/0137311 A1 | 6/2005 | Muylem et al. | |
| 2005/0159552 A1 | 7/2005 | Reed et al. | |
| 2007/0021562 A1 | 1/2007 | Reed et al. | |
| 2008/0164445 A1 | 7/2008 | Lin et al. | |
| 2008/0167427 A1 | 7/2008 | Lin et al. | |
| 2009/0264599 A1 | 10/2009 | Balhoff et al. | |
| 2009/0299012 A1 | 12/2009 | Luther | |

FOREIGN PATENT DOCUMENTS

| | | |
|---|---|---|
| EP | 0201411 A2 | 11/1986 |
| EP | 1510530 A1 | 3/2005 |
| GB | 796446 | 6/1958 |
| JP | 6-322022 | 11/1994 |
| JP | 08-53511 | 2/1996 |
| JP | 09-227625 | 9/1997 |
| JP | 11-043511 | 2/1999 |
| JP | 2000-248018 | 9/2000 |
| JP | 2000-248021 | 9/2000 |
| JP | 2000-281800 | 10/2000 |
| WO | WO 95/01380 | 1/1995 |
| WO | 9747663 A1 | 12/1997 |
| WO | 9813395 A1 | 4/1998 |
| WO | 9813396 A1 | 4/1998 |
| WO | 9813397 A1 | 4/1998 |
| WO | 9850439 A1 | 11/1998 |
| WO | 9925746 A1 | 5/1999 |
| WO | 9955770 A1 | 11/1999 |
| WO | 0014125 A1 | 3/2000 |
| WO | 0014158 A1 | 3/2000 |
| WO | 02072645 A2 | 9/2002 |
| WO | 2005063869 A1 | 7/2005 |
| WO | 2005068513 A1 | 7/2005 |
| WO | WO 2005/068513 A1 | 7/2005 |
| WO | 2005095685 A1 | 10/2005 |
| WO | 2005118245 A1 | 12/2005 |
| WO | WO 2005/118245 A1 | 12/2005 |
| WO | 2006019414 A1 | 2/2006 |
| WO | 2007005233 A1 | 1/2007 |
| WO | 2007076355 A1 | 7/2007 |
| WO | 2007076369 A1 | 7/2007 |
| WO | 2008024824 A1 | 2/2008 |
| WO | 2008066970 A1 | 2/2008 |
| WO | 2008086359 A2 | 7/2008 |
| WO | 2008086362 A1 | 7/2008 |
| WO | 2009058966 A1 | 5/2009 |
| WO | 20090528966 A1 | 5/2009 |

OTHER PUBLICATIONS

NFM Welding Engineers, Inc., Devolatilization, printed from website www.nfm.net/technologies/devolatilizatiion, on May 16, 2006, 3 pages.

Pall Corporation, AquaSep® Plus L/L Coalescer System, printed from website www.pall.com/variants/print on May 2, 2006, 5 pages.

Brown, R.L., et al., "Improve Suspended Water Removal From Fuels", Hydrocarbon Processing, Dec. 1993, pp. 95-99.

Encyclopedia of Polymer Science and Technology, vol. 10, Polyamide Plastics, John Wiley & Sons, 1989, pp. 460-482.

Encyclopedia of Polymer Science and Technology, vol. 11, Polyesters, John Wiley & Sons, 1989, pp. 62-128.

Encyclopedia of Polymer Science and Engineering, vol. 16, Styrene Polymers to Toys, John Wiley & Sons, 1989, pp. 46-63.

Kirk-Othmer, Encyclopedia of Chemical Technology, $4^{th}$ edition, vol. 19, 1996, Polyamindes (Plastics), pp. 559-584.

* cited by examiner

PROCESS TECHNOLOGY FOR RECOVERING BROMINATED STYRENIC POLYMERS FROM REACTION MIXTURES IN WHICH THEY ARE FORMED AND/OR CONVERTING SUCH MIXTURES INTO PELLETS OR INTO GRANULES OR PASTILLES

REFERENCE TO RELATED APPLICATIONS

This application is the National Stage of International Patent Appl. No. PCT/US2007/073805 filed on Jul. 18, 2007, which in turn claims the benefit of U.S. Provisional Patent Appl. Nos. 60/832,184, filed on Jul. 20, 2006, and 60/867,548, filed on Nov. 28, 2006, the disclosures of which are incorporated herein by reference.

BACKGROUND

U.S. Pat. Nos. 5,677,390, 5,686,538, 5,767,203, 5,852,131, 5,852,132, 5,916,978, 6,113,381, 6,207,765, 6,232,393, 6,232,408, 6,235,831, 6,235,844, 6,326,439, and 6,521,714 describe very desirable process technology for producing brominated styrenic polymers such as brominated polystyrene having the best known properties of any previously-known brominated styrenic polymer. In this connection, the terms "brominated styrenic polymer" and "brominated polystyrene" as used in the specification and in the claims hereof refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers typically being considerably different from brominated polystyrene in a number of respects. Also as used herein, including the claims, the term "anionic styrenic polymer" or "anionic polystyrene", terms commonly used by persons skilled in the art, denotes that the polymer referred to has been produced by use of an anionic polymerization initiator, such as a lithium alkyl. The terms "brominated styrenic polymer" and "brominated polystyrene" include and are generic to the terms "brominated anionic styrenic polymer" or "brominated anionic polystyrene". These generic terms also include, for example, brominated styrenic polymers produced by bromination of styrenic polymers or polystyrene made by free radical polymerization.

As indicated in the above patents, the common method for recovering the brominated styrenic polymer from the liquid phase of the bromination reaction mixture involves deactivating the catalyst with an aqueous quenching medium, separating the brominated polymer-containing organic phase from the aqueous phase, stripping the organic phase of its solvent usually by feeding the organic phase into boiling water whereby the brominated polymer is precipitated, recovering the precipitated brominated polymer by a liquid-solids separation technique such as filtration or centrifugation, and drying the resultant finely-divided brominated styrenic polymer. It would be highly advantageous if a way could be found for recovering the brominated styrenic polymer in a more efficient and less costly manner.

When blending a brominated styrenic polymer with a substrate thermoplastic polymer to be flame retarded, it is desirable that the brominated styrenic polymer be in the form of pellets, granules, or pastilles. Unfortunately, a characteristic of brominated anionic styrenic polymers such as brominated anionic polystyrene, and to a lesser extent, brominated styrenic polymer made by free-radical polymerization as well, is a propensity to form substantial amounts of small particles and powders when attempts are made to pelletize the product. It appears that the pellets, unless bound together by an extraneous binding agent or the like, tend during formation, handling, and/or packaging to break apart and to revert to small particles and finely-divided powder, typically referred to as "fines". Because of this characteristic, various conventional pelletizing or compacting procedures are unsuitable for producing brominated anionic styrenic polymers essentially free of fines and that during shipment and handling remain essentially free of fines. As can be readily appreciated, the existence or formation of fines in a product of this type is not only detrimental to the appearance of the pelletized product but in addition is undesired by the consumer.

In order to effectively use brominated styrenic polymers, especially brominated anionic styrenic polymers, as flame retardants in certain thermoplastic polymers, the use of binding agents or other extraneous materials to maintain the integrity of the flame retardant in pelletized form, is also deemed undesirable by some consumers. Thus, it is desirable to be able to produce unadulterated pelletized brominated styrenic polymers, especially brominated anionic styrenic polymers, that do not form undesirable amounts of fines during their preparation, packaging, shipment, and handling.

In the production of pelletized brominated styrenic polymers, especially brominated anionic styrenic polymers, it is important to improve the efficiency of the operation and to minimize operating costs. Recovery and recycle of fines avoids waste of product and minimizes waste disposal considerations. However the greater the amount of fines produced, recovered and recycled, the lower the production rate of pellets per quantity of polymer being subjected to pelletization. It would be highly advantageous, therefore, if a way could be found of preparing brominated styrenic polymers, especially unadulterated brominated anionic styrenic polymers, in pelletized form in a highly cost-efficient manner while avoiding formation of excessive amounts of fines, so that the production rate of high quality pellets is not materially impaired. In the case of brominated anionic styrenic polymers, it would be especially desirable if a way could be found of producing granules or pastilles of the polymers. This would enable the achievement of a number of important advantages in the process, including the overall process, the handling and storage of the product, and in the transportation of the product to, and the use of the product by, the end user.

SUMMARY OF THE INVENTION

Pursuant to one group of embodiments of this invention brominated styrenic polymers, and especially brominated anionic styrenic polymers, can be recovered much more readily and efficiently, and at lower cost, from solution in a solvent, and especially from solution in the solvent in which they were formed, as compared to the common method for recovery referred to above.

Pursuant to another group of embodiments of this invention brominated styrenic polymers, especially brominated anionic styrenic polymers, can now be produced and packaged in unadulterated pelletized form essentially free of fines. As used herein, including the claims, the terms "pellets", "pelletized", "pelletizing", etc., refers to a quantity of particles which, if screened using conventional screening practices, are in the size range of that can pass through a screen of about 4 standard U.S. mesh size and which are retained on a screen of about 40 standard U.S. mesh size. The particles in such size range can be of any shape and thus may also be referred to as granules, and thus as used herein including the claims the terms "pellets" "pelletized", "pelletizing", etc. include respectively "granules", "granular", "granulating", etc. Due to electrostatic charges, incomplete screening, or the like, some small amount (e.g., less than about 5 wt % based on the total weight of the pellets in such size range) of finer-sized particles may remain in the product. By the term "unadulterated" as used herein including the claims is meant that no extraneous ingredients such as binders (e.g., waxes or other polymeric or oligomeric substances), inorganic salts, or the like are added to the brominated styrenic polymer prior to or during the preparation the pellets. Instead, the brominated styrenic polymer contains only residual impurities that remain in the brominated polymer after its preparation.

Moreover, preferred embodiments of this invention make possible on an economical basis the benefits of avoiding formation of undesirable amounts of fines, since only relatively small amounts of fines are produced in the operation and the unadulterated pellets formed have good hardness and crush strength. In fact, in preferred processes of this invention small amounts of dry fines that may exist in the product being formed can be recovered and recycled in the operation without much expense or difficulty.

Other particularly preferred embodiments of this invention enable the production of brominated anionic styrenic polymers in the form of granules or pastilles which have relatively smooth surfaces and which thus are more readily handled, stored, shipped, and used without formation of undesirable amounts of fines.

In each of the embodiments of this invention a "polymer melt", "polymer flow", "melt", or "flow" is formed from a brominated styrenic polymer, preferably a brominated anionic styrenic polymer, in a devolatilization extruder, As used herein including the claims, the terms "polymer melt", "polymer flow", "melt", or "flow" refer to the fact that the brominated styrenic polymer within the devolatilization extruder becomes a melted mass and/or a sufficiently softened mass that will thenceforth proceed (i.e., flow) through the remainder of the devolatilization extruder (including any extension that may be added thereto) and a die disposed at the discharge end of the machine under the thrust provided within the machine by the screw(s) thereof. It matters not whether, strictly speaking, a true melt of brominated styrenic polymer has been formed or whether the brominated styrenic polymer has merely been softened to such an extent that it will flow as just indicated.

Accordingly, among one group of embodiments of this invention there are provided processes for recovering brominated styrenic polymer, typically having a bromine content of at least about 50 wt %, from solution in a vaporizable solvent, preferably a vaporizable halogenated solvent. These processes comprise converting in a devolatilization extruder an admixture of extrudable viscosity comprised of brominated styrenic polymer and a vaporizable organic solvent into a brominated styrenic polymer melt or flow and a separate vapor phase comprised predominately of vaporizable solvent, recovering said melt or flow of brominated styrenic polymer while in the form of a melt or flow from the devolatilization extruder, and allowing or causing said melt or flow to solidify. In preferred embodiments of this group, the process preferably further comprises subdividing the solidified melt into a powder, granular or pelletized form. Alternatively or in addition, the process further comprises recovering and allowing or causing the vapor phase to liquefy as vaporizable solvent. Preferably, such liquefied solvent is recycled as vaporizable solvent used in forming additional solution of brominated styrenic polymer. In particularly preferred embodiments of this group of embodiments an admixture of brominated styrenic polymer and vaporizable organic solvent of less than extrudable viscosity is converted into an admixture of extrudable viscosity which is subsequently processed in a devolatilization extruder as described earlier in this paragraph. This conversion from less than extrudable viscosity to extrudable viscosity is typically accomplished by removing, e.g., by distillation or flash distillation, a sufficient amount of vaporizable organic solvent, preferably a vaporizable halogenated organic solvent, from the admixture of less than extrudable viscosity to form an admixture of extrudable viscosity. In especially preferred embodiments of this group of embodiments, the admixture of less than extrudable viscosity is formed by brominating styrenic polymer in vaporizable organic solvent, preferably a halogenated organic solvent, and obtaining from the bromination process an admixture of less than extrudable viscosity comprised of brominated styrenic polymer, typically having a bromine content of at least about 50 wt %, and vaporizable solvent, preferably a halogenated organic solvent. Often such admixtures of less than extrudable viscosity are solutions of brominated styrenic polymer having a bromine content of at least 50 wt %, preferably at least about 60 wt %, and more preferably at least about 67 wt %, in a vaporizable organic solvent, preferably a vaporizable halogenated organic solvent. In some embodiments of this group of embodiments, particular ways of conducting the bromination reaction and/or ensuing work up operations leading to the formation of an admixture of less than extrudable viscosity are utilized as preliminary operations. In some of the embodiments of this group of embodiments, before processing an admixture of brominated styrenic polymer and vaporizable organic solvent of extrudable viscosity in a devolatilzation extruder as described earlier in this paragraph this admixture is subjected to a coalescing filtration to remove entrained water and dissolved salts that may be present in such admixture. Another preferred operation that may be performed in the various embodiments of this group of embodiments is preheating of the admixture of extrudable viscosity if it is in the form of solids at a temperature below about 175° C. prior to being at extrudable viscosity for processing within the devolatilization extruder as described earlier in this paragraph. This preheating can be accomplished either in a preheater section already associated with the devolatilization extruder as manufactured or by use of a separate preheater which discharges its suitably preheated contents into the inlet portion of the devolatilization extruder. The preheating should raise the temperature of the admixture so that it can be fed in at least a softened movable state, a partially liquefied state, a liquefied state, or at an extrudable viscosity into the devolatilization extruder. In addition, temperature control within the extruder can be effected by screw design, screw speed, and/or barrel temperature regulation. Also, the devolatilization extruder may be provided with cooling capabilities to avoid localized overheating.

Among another group of embodiments of this invention there are provided processes for preparing pelletized brominated styrenic polymer, typically having a bromine content of at least about 50 wt %, from the extrudate from a devolatilization extruder functioning as described in the immediately preceding paragraph. The various embodiments of this group of embodiments utilize any of the embodiments described in the immediately preceding paragraph involving the processing of an admixture of extrudable viscosity in a devolatilization extruder, including each of the various embodiments described in the immediately preceding paragraph that involve one or more operations conducted prior to such processing in the devolatilization extruder. Thus instead of recovering a melt or flow of brominated styrenic polymer while in the form of a melt or flow from the devolatilization extruder, and allowing or causing said melt or flow to solidify, in this group of embodiments the melt or flow from the devolatilization extruder is passed through a die to produce one, or more than one, emerging strand of brominated styrenic polymer melt or flow, the strand(s) is/are allowed or caused to solidify, and the strand(s) is/are subdivided into solidified pellets of brominated styrenic polymer. Preferred ways of processing such strand(s) form additional embodiments of this group of embodiments of this invention.

Still another group of embodiments of this invention involve a process of producing granules or pastilles of unadulterated brominated anionic styrenic polymer, which process comprises:

converting in a devolatilization extruder, an admixture of brominated styrenic polymer and a vaporizable organic solvent into a melt or flow of brominated anionic styrenic polymer and a separate vapor phase of said solvent; and forming from said melt or flow a downwardly oriented plug flow from at least one orifice in a manifold or nozzle that is in proximity to a cooled traveling planar member, said planar member being impervious to cooling liquid and having an upper and lower surface, whereby there is a gap between the lower portion of the orifice and said upper surface, so that at least a portion of a plug of molten unadulterated brominated anionic styrenic polymer either (i) bridges said gap and forms a separate individual granule or pastille on the upper surface of said planar member, or (ii) freely drops from the lower portion of the orifice and falls upon the upper surface of said planar member and forms an individual granule or pastille on the upper surface of said planar member, said traveling member being cooled by a mist or spray of cooling liquid contacting the lower surface of said planar member.

The above and other embodiments, features and/or advantages of this invention will become still further apparent from the ensuing description, accompanying drawings, and appended claims.

Except for the embodiments involving preparation of granules or pastilles from brominated anionic styrenic polymer such as brominated anionic polystyrene, in all of the other embodiments of this invention such as those referred to above and those described hereinafter, preferred brominated styrenic polymers are those formed by bromination of styrenic polymers formed by free radical polymerization ("free-radical styrenic polymers"). Especially preferred are brominated styrenic polymers formed by bromination of styrenic polymers prepared by anionic polymerization ("anionic styrenic polymers"). Of the free-radical styrenic polymers, rubber-free polystyrene formed by free radical polymerization is preferred ("free-radical polystyrene"). Of the anionic styrenic polymers, rubber-free polystyrene formed by anionic polymerization is preferred ("anionic polystyrene"). While other types of brominated styrenic polymers such as brominated styrenic polymer formed by bromination of styrenic polymer formed by cationic polymerization can be used they are not preferred.

As used herein, including the claims, the term "extrudable viscosity" means that the admixture has a viscosity in the range of about 5000 to about 5,000,000 centipoise at 100 reciprocal seconds while at a temperature in the range of about 175° C. to about 300° C. Such admixtures can be caused to flow (e.g. by means of a suitable pump) into and through a devolatilization extruder and be worked within the extruder to release vaporizable organic solvent in the vapor state when the admixture is at least at one or more temperatures in and/or above the foregoing range. By the term "admixture" is meant a mixture of specified components, which mixture can be in the form of solids, or preferably in the form of at least one liquid phase and which, whether in the form of one liquid phase or more than one liquid phase, can have one or more solid phases suspended therein. It should be noted that the term "extrudable viscosity" refers to a viscosity that the admixture will achieve when it is being processed within the devolatilization extruder. Prior to this processing the admixture of extrudable viscosity need not be, and usually is not, at extrudable viscosity.

In all process embodiments of this invention the admixture of extrudable viscosity preferably is not exclusively in the form of solids, but rather is in the form of a viscous flowable mass having a liquid phase which can have solids suspended or dispersed therein.

All references in this specification or in the ensuing claims to "pressure" in connection with a devolatilization extruder or its use relate to the reduced pressures (vacuum) imposed upon the melt or flow, and do not relate to the force exerted upon the melt or flow by the screw(s) of the devolatilization extruder. To determine in any embodiment of this invention the amount of organic solvent in the polymer, it is desirable to use NMR analysis. The result should show that the melt or flow of brominated styrenic polymer that has exited from the outlet portion of the devolatilization extruder contains an average of less than about 10,000 ppm (wt/wt), and preferably less than about 5000 ppm (wt/wt), and still more preferably less than about 1000 ppm (wt/wt) of the organic solvent in steady state operation.

FURTHER DETAILED DESCRIPTION OF THE INVENTION

Figure 1:
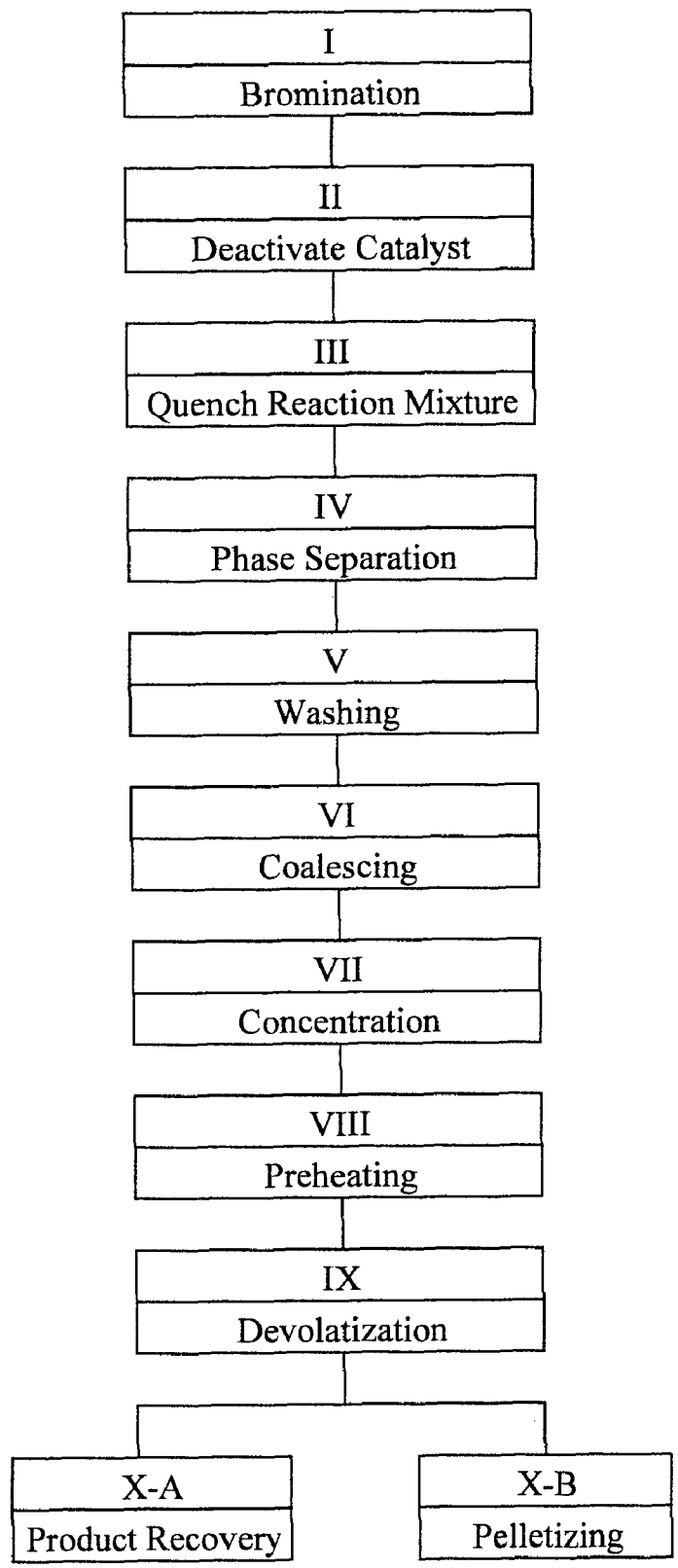
FIG. 1 is a block diagram illustrating an overall process for the preparation and isolation of the pelletized unadulterated brominated styrenic polymers of this invention.

Some Embodiments Involving Recovering Brominated Styrenic Polymer

A) A process for recovering brominated styrenic polymer from admixture in a vaporizable organic solvent, which process comprises processing an admixture of at least extrudable viscosity comprised of brominated styrenic polymer typically having a bromine content of at least about 50 wt %, preferably at least about 60 wt %, and more preferably at least about 67 wt %, and a vaporizable organic solvent, in a devolatilization extruder to form a melt or flow of such brominated styrenic polymer and a vapor phase comprised of vaporizable organic solvent, recovering from the devolatilization extruder such melt or flow of brominated styrenic polymer while in the form of a melt or flow, and allowing or causing said melt or flow to solidify. Preferably, the melt or flow of such brominated styrenic polymer that has exited from the outlet portion of the devolatilization extruder contains an average of less than about 10,000 ppm (wt/wt), more preferably less than about 5000 ppm (wt/wt), and still more preferably less than about 1000 ppm (wt/wt) of the organic solvent in steady-state operation of the devolatilization extruder. Preferably, the vapor phase is also recovered.

B) A process for recovering brominated styrenic polymer from admixture in a vaporizable organic solvent, which process comprises continuously introducing into the inlet portion of an operating devolatilization extruder, an admixture of extrudable viscosity, said admixture comprising brominated styrenic polymer typically having a bromine content of at least about 50 wt %, preferably at least about 60 wt %, and more preferably at least about 67 wt %, and a vaporizable organic solvent, said extruder having an inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections; and operating said section disposed downstream at higher temperature and lower pressure conditions than the temperature and pressure conditions of said section disposed upstream, so that (a) a flow or melt of said polymer is formed within the devolatilization extruder and released from the polymer melt or polymer flow outlet, and (b) volatiles composed predominately of the solvent released from the polymer in said at least two sections can be collected by said vapor collecting apparatus, the melt or flow of such brominated styrenic polymer that has exited from the outlet portion of the devolatilization extruder containing an average of less than about 10,000 ppm (wt/wt), preferably less than about 5000 ppm (wt/wt), and still more preferably less than about 1000 ppm (wt/wt) of the organic solvent in steady-state operation of the devolatilization extruder.

C) A process for recovering brominated styrenic polymer from admixture with a vaporizable solvent, preferably a vaporizable halogenated solvent, which admixture is an admixture of less than extrudable viscosity, such as a solution containing in the range of about 15 to about 40 wt % of brominated anionic styrenic polymer (preferably brominated anionic polystyrene) formed by brominating to a bromine content of about 50 wt %, preferably at least about 60 wt %, and more preferably at least about 67 wt %, and anionic styrenic polymer, preferably anionic polystyrene, having a GPC weight average molecular weight in the range of about 2000 to about 200,000, preferably in the range of about 2000 to about 10,000, and more preferably in the range of about 3000 to about 7000, such process comprising:

concentrating or converting such admixture into an admixture of extrudable viscosity by distillation, preferably by flash distillation; and utilizing such admixture of extrudable viscosity as the feed in the process as described in embodiment A) or embodiment B) above.

In embodiments of this invention involving concentrating or converting a precursor admixture, e.g., a solution or suspension, of less than extrudable viscosity by utilizing distillation or flash distillation to accomplish concentration or conversion to an admixture of extrudable viscosity, several advantages are achieved. In addition to introducing into a devolatilization extruder a more concentrated admixture or solution for conversion into a melt or polymer flow and thus reducing the amount of solvent to be recovered by operation of the devolatilization extruder, the initial solution of the brominated styrenic polymer is heated to effect the distillation or flash distillation. Thus by promptly feeding the distilled or flash distilled admixture of extrudable viscosity into the devolatilization extruder, such admixture is in effect preheated, thus reducing the total heat energy required by the devolatilization extruder to convert the admixture into a melt or polymer flow. Concentration also removes water with the distilled solvent so that any organic solvent removed in the devolatilization extruder is anhydrous and suitable for direct recycle to bromination without a separate drying step. In addition, the anhydrous feed to the devolatilization extruder is less corrosive because of the absence of water in such feed. In embodiments where concentrating the brominated styrenic polymer admixture is not required, the same advantages (except for the removal of water) can be achieved by preheating the admixture of extrudable viscosity prior to feeding it to the devolatilization extruder.

Also, unlike the recovery process of U.S. Pat. No. 5,043,421, which requires use in an extruder of at least one non-solvent such as an alkanol or ketone (specifically methanol, 2-propanol, or acetone), the recovery embodiments of this invention do not require use of any such non-solvent. In other words, the recovery processes of this invention preferably do not feed into the devolatilization extruder any such non-solvent, and preferably the recovered extrudate is devoid of detectable amounts of such alcoholic or ketonic non-solvents.

Some Embodiments Involving Forming Pelletized Brominated Styrenic Polymer

1) A process for producing pelletized brominated styrenic polymer from admixture in a vaporizable organic solvent, which process comprises processing an admixture of at least extrudable viscosity comprised of brominated styrenic polymer typically having a bromine content of at least about 50 wt %, preferably at least about 60 wt %, and more preferably at least about 67 wt %, and a vaporizable organic solvent, in a devolatilization extruder to form a melt or flow of such brominated styrenic polymer and a vapor phase comprised of vaporizable organic solvent, recovering from the devolatilization extruder such melt or flow of brominated styrenic polymer while in the form of a melt or flow, and converting such melt or flow into solid pellets of brominated styrenic polymer.

2) A process for producing pelletized brominated styrenic polymer from solution in a vaporizable solvent, which process comprises converting in a devolatilization extruder an admixture of brominated styrenic polymer typically having a bromine content of at least about 50 wt %, preferably at least about 60 wt %, and more preferably at least about 67 wt %, and a vaporizable organic solvent into a brominated styrenic polymer melt or flow and a separate vapor phase comprised predominately of vaporizable organic solvent, allowing or causing said melt or flow of brominated styrenic polymer while in the form of a melt or flow to pass from the devolatilization extruder through a die thereby producing emerging strands of brominated styrenic polymer melt or flow, allowing or causing said strands to solidify, and subdividing the strands into solidified pellets of brominated styrenic polymer.

3) A process for producing pelletized brominated styrenic polymers from a solution in a vaporizable solvent, which process comprises:

converting in a devolatilization extruder, an admixture of brominated styrenic polymer, preferably an admixture of brominated anionic styrenic polymer, and a vaporizable organic solvent into a melt or flow of brominated styrenic polymer, preferably a melt or flow of brominated anionic styrenic polymer, and a separate vapor phase of said solvent;

extruding the melt or polymer flow from the devolatilization extruder through a die to produce traveling strand(s) of extruded polymer melt or polymer flow;

enabling and/or causing such traveling strand(s) to solidify and be broken, subdivided, or otherwise converted into pellets of the brominated styrenic polymer; and subjecting the pellets to size classification to remove and recover from such product (a) oversized particles, if any, and (b) fines, if any, that may be present in such product.

The first mentioned step of this embodiment, that of converting a solution of brominated styrenic polymer into a melt or polymer flow of brominated styrenic polymer in a devolatilization extruder, can be, and preferably is, conducted as in the above-described product recovery embodiments. Also by preheating the solution or concentrating the solution by use of flash distillation before feeding the more concentrated solution to the devolatilization extruder, the above-described advantages of reducing the amount of solvent to be removed by, and reducing the heat energy requirements of the devolatilization extruder to produce the polymer melt or polymer flow, can be achieved.

Apart from the advantages afforded by pre-concentrating and/or preheating the brominated styrenic polymer solution, an advantage of the foregoing pelletizing embodiment of this invention is the fact that it is possible to use unadulterated brominated styrenic polymers, such as unadulterated brominated anionic styrenic polymers, and thereby form pellets of unadulterated brominated styrenic polymers, such as unadulterated brominated anionic styrenic polymers which have desirable properties such as improved hardness and reduced fines-producing tendencies during manufacture, handling, storage, and use.

4) A process for the preparation of a brominated styrenic polymer in pelletized form, which process comprises:

brominating a styrenic polymer under superatmospheric pressure in a vaporizable organic solvent and in the presence of a Lewis acid bromination catalyst, and in a closed reaction system in which substantially all of the hydrogen halide coproduct is retained in the reaction mixture;

quenching the catalyst to thereby form (i) an organic phase containing dissolved brominated styrenic polymer and (ii) an aqueous phase containing hydrogen halide;

separating phases (i) and (ii) from each other, and if phase (i) has a viscosity less than extrudable viscosity, concentrating organic phase of (i) to form an admixture of extrudable viscosity;

continuously introducing organic phase of (i) or admixture of extrudable viscosity into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections; and operating said section disposed downstream at higher temperature and lower pressure conditions than the temperature and pressure conditions of said section disposed upstream, so that (a) a flowable polymer melt or polymer flow of said polymer is formed within the devolatilization extruder and can leave from the at least one polymer melt or polymer flow outlet, and (b) volatiles composed predominately of the solvent released from the polymer in said at least two sections are collected by said vapor collecting apparatus;

having said polymer melt or polymer flow leaving the devolatilization extruder pass through a die to produce one or more traveling continuous strands of extruded polymer melt or polymer flow;

enabling and/or causing such continuous traveling strand(s) to solidify and be broken, subdivided, or otherwise converted into pellets of the brominated styrenic polymer.

Some Further Embodiments of this Invention for Producing Pelletized Products

Still other embodiments of this invention relate to:

new pelletized unadulterated brominated styrenic polymers and preferably, new unadulterated pelletized brominated anionic styrenic polymers, having superior hardness and/or crush strength properties;

novel continuous processes for the production of highly pure melts or flows of brominated anionic styrenic polymer (especially brominated anionic polystyrene) using as raw materials (1) anionic styrenic polymer (especially anionic polystyrene), (2) brominating agent (especially bromine), (3) Lewis acid catalyst (especially aluminum halide catalyst in which the halogen atoms are bromine and or chlorine, and (4) vaporizable organic solvent (especially vaporizable halogenated solvent);

novel continuous processes for the production of highly pure pellets of brominated anionic styrenic polymer (especially brominated anionic polystyrene), using as raw materials (1) anionic styrenic polymer (especially anionic polystyrene), (2) brominating agent (especially bromine), (3) Lewis acid catalyst (especially aluminum halide catalyst in which the halogen atoms are bromine and or chlorine, and (4) vaporizable organic solvent (especially vaporizable halogenated solvent);

new pelletized brominated anionic styrenic polymers (especially, new unadulterated pelletized brominated anionic styrenic polymers), having reduced levels of ionic bromine (i.e., bromide) content, as well as superior hardness and/or crush strength properties.

In the various embodiments of this invention the extrudate from the devolatilization extruder typically has an average of less than about 10,000 ppm (wt/wt), and preferably less than about 5 000 ppm (wt/wt), and still more preferably less than about 1000 ppm (wt/wt) ppm of the organic solvent in steady-state operation and thus has desirable hardness and strength properties with attendant reduced fines-forming tendencies.

Some Embodiments Involving Forming Granules or Pastilles of Brominated Styrenic Polymer These embodiments comprise a process of producing granules or pastilles of unadulterated brominated anionic styrenic polymer, which process comprises:

converting in a devolatilization extruder, an admixture of brominated styrenic polymer and a vaporizable organic solvent into a melt or flow of brominated anionic styrenic polymer and a separate vapor phase of said solvent; and forming from said melt or flow a downwardly oriented plug flow from at least one orifice in a manifold or nozzle that is in proximity to a cooled traveling planar member, said planar member being impervious to cooling liquid and having an upper and lower surface, whereby there is a gap between the lower portion of the orifice and said upper surface, so that at least a portion of a plug of molten unadulterated brominated anionic styrenic polymer either (i) bridges said gap and forms a separate individual granule or pastille on the upper surface of said planar member, or (ii) freely drops from the lower portion of the orifice and falls upon the upper surface of said planar member and forms an individual granule or pastille on the upper surface of said planar member, said traveling member being cooled by a mist or spray of cooling liquid contacting the lower surface of said planar member.

In this process, the traveling planar member is preferably an endless belt impervious to cooling liquid such as an endless steel belt. In the operation at least a portion of the plug of molten unadulterated brominated anionic styrenic polymer bridges said gap and forms a separate individual granule or pastille on the upper surface of said planar member, or at least a portion of such plug of molten unadulterated brominated anionic styrenic polymer freely drops from the lower portion of the orifice and falls upon the upper surface of the planar member and forms an individual granule or pastille on the upper surface of the planar member. It is also possible to operate such that (a) at least a portion of said plug of molten unadulterated brominated anionic styrenic polymer bridges said gap and forms a separate individual granule or pastille on the upper surface of said planar member; or wherein (b) at least a portion of said plug of molten unadulterated brominated anionic styrenic polymer freely drops from the lower portion of the orifice and falls upon the upper surface of said planar member and forms an individual granule or pastille on the upper surface of said planar member; (a) and (b) occurring in an alternating or random manner.

Although other cooling liquids can be employed, said mist or spray of cooling liquid is preferably a mist or spray of cooling water. The mist or spray is preferably applied to the lower surface of said planar member below the region in which the separate individual granule or pastille is formed on the upper surface of said planar member.

Another embodiment of this invention is an overall process for producing brominated anionic styrenic polymer in the form of granules or pastilles of unadulterated brominated anionic styrenic polymer. Such process comprises:

brominating an anionic styrenic polymer under superatmospheric pressure in a vaporizable solvent and in the presence of a Lewis acid bromination catalyst, and in a closed reaction system in which substantially all of the hydrogen halide coproduct is retained in the reaction mixture;

quenching the catalyst to thereby form (i) an organic phase containing dissolved brominated styrenic polymer and (ii) an aqueous phase containing hydrogen halide;

separating phases (i) and (ii) from each other, and if phase (i) has a viscosity less than extrudable viscosity, concentrating organic phase of (i) to form an admixture of extrudable viscosity;

continuously introducing organic phase of (i) or admixture of extrudable viscosity into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections;

operating said section disposed downstream at higher temperature and lower pressure conditions than the temperature and pressure conditions of said section disposed upstream, so that (a) a flowable polymer melt or polymer flow of said polymer is formed within the devolatilization extruder and released from the at least one polymer melt or polymer flow outlet, and (b) volatiles composed predominately of the solvent released from the polymer in said at least two sections are collected by said vapor collecting apparatus;

forming from said flowable polymer melt or polymer flow of said polymer a downwardly oriented plug flow from at least one orifice in a manifold or nozzle that is in proximity to a cooled traveling planar member, said planar member being impervious to cooling liquid and having an upper and lower surface, whereby there is a gap between the lower portion of the orifice and said upper surface, so that at least a portion of a plug of molten unadulterated brominated anionic styrenic polymer either (i) bridges said gap and forms a separate individual granule or pastille on the upper surface of said planar member, or (ii) freely drops from the lower portion of the orifice and falls upon the upper surface of said planar member and forms an individual granule or pastille on the upper surface of said planar member, said traveling member being cooled by a mist or spray of cooling liquid contacting the lower surface of said planar member.

In this embodiment, the traveling planar member is preferably an endless belt impervious to cooling liquid, and more preferably is an endless steel belt. In addition, the mist or spray of cooling liquid is preferably a mist or spray of cooling water. The mist or spray is preferably applied to the lower surface of said planar member below the region in which the separate individual granule or pastille is formed on the upper surface of said planar member.

Brominated Styrenic Polymer

Styrenic polymers which are brominated to form the brominated styrenic polymers recovered and/or pelletized pursuant to this invention are one or more homopolymers and/or copolymers of one or more vinyl aromatic monomers. Preferred vinyl aromatic monomers have the formula:

$$H_2C=CR-Ar$$

wherein R is a hydrogen atom or an alkyl group having from 1 to 4 carbon atoms and Ar is an aromatic group (including alkyl-ring substituted aromatic groups) of from 6 to 10 carbon atoms. Examples of such monomers are styrene, alpha-methylstyrene, ortho-methylstyrene, meta-methylstyrene, para-methylstyrene, para-ethylstyrene, isopropenyltoluene, vinylnaphthalene, isopropenylnaphthalene, vinylbiphenyl, vinylanthracene, the dimethylstyrenes, and tert-butylstyrene. Polystyrene is the preferred reactant. When the brominated styrenic polymer is made by bromination of a copolymer of two or more vinyl aromatic monomers, it is preferred that styrene be one of the monomers and that styrene comprise at least 50 weight percent and preferably at least about 80 weight percent of the copolymerizable vinyl aromatic monomers. The terms "vinylaromatic" and "styrenic" in connection with monomer(s) or polymer(s) are used interchangeably herein.

The aromatic pendant constituents of the styrenic polymer to be brominated can be alkyl substituted or substituted by bromine or chlorine atoms, but preferably will not be so substituted. Typically, anionic styrenic polymers used to produce the brominated anionic styrenic polymers used in the practice of this invention will have a GPC weight average molecular weight ($M_w$) in the range of about 2000 to about 200,000, preferably in the range of about 3000 to about 10,000, and more preferably in the range of about 3000 to about 7000. The polydispersity of such anionic styrenic polymers will typically be in the range of between 1 and about 4, and more preferably in the range of between 1 and about 2. Typically, styrenic polymers produced by free radical polymerization that are used to produce the brominated styrenic polymers using a process of this invention will have a GPC weight average molecular weight ($M_w$) in the range of about 30,000 to about 500,000, preferably in the range of about 50,000 to about 300,000, and more preferably in the range of about 150,000 to about 250,000. The polydispersity of such styrenic polymers produced by free radical polymerization will typically be in the range of between 1 and about 10. All of the foregoing $M_w$ and polydispersity values are based on gel permeation chromatography (GPC) techniques which are hereinafter described.

The polymers which are converted into unadulterated pelletized form pursuant to this invention are a single brominated styrenic polymer or a blend of two or more brominated styrenic polymers, preferably a single brominated anionic styrenic polymer or a blend of two or more brominated anionic styrenic polymers. The foregoing blends can be of brominated homopolymers only, brominated copolymers only, or at least one brominated homopolymer and at least one brominated copolymer of styrenic monomer(s). Desirably, the bromine content of all such polymers is at least about 50 percent by weight, although styrenic polymers with lower bromine contents can readily be produced by this invention. Preferably polymers of these types have a bromine content of at least about 60 wt %, more preferably of at least about 64 wt %, still more preferably at least about 67 wt %, and even more preferably at least about 68 wt %. Usually the maximum bromine content is about 71 wt % with polymers having a maximum of about 70 wt % bromine being more preferred. As between homopolymers and copolymers, brominated polystyrene polymers made by free radical polymerization are preferred and brominated anionic polystyrene polymers are more preferred.

Methods for the production of styrenic polymers by free radical polymerization processes are well known in the art and reported in the literature. See for example Encyclopedia of Polymer Science and Engineering, volume 16, John Wiley and Sons, 1989, pages 46-62. For convenience, the term "free-radically produced styrenic polymer" or "free-radically produced polystyrene", whether in the singular or plural, is used in the claims to denote that the styrenic polymer or polystyrene being referred to was produced previously before bromination by use of, or by another party's use of, a free radical polymerization process. Methods for the preparation of anionic styrenic polymers such as anionic polystyrene are also known in the art and reported in the literature. See for example, U.S. Pat. Nos. 3,812,088; 4,200,713; 4,442,273; 4,883,846; 5,391,655; 5,717,040; and 5,902,865, the disclosures of which are incorporated herein by reference. An especially preferred method is described in commonly-owned U.S. Pat. No. 6,657,028, issued Dec. 2, 2003, the disclosure of which method is incorporated herein by reference.

Bromination processes which can be used for producing a brominated anionic styrenic polymer are disclosed in U.S. Pat. Nos. 5,677,390; 5,686,538; 5,767,203; 5,852,131; 5,852,132; 5,916,978; 6,133,381; 6,207,765; 6,232,393; 6,232,408; 6,235,831; 6,235,844; 6,326,439; and 6,521,714 which disclosures are incorporated herein by reference.

In all embodiments of this invention the preferred brominated styrenic polymers formed and/or used are brominated anionic styrenic polymers, and of the brominated anionic styrenic polymers, brominated anionic polystyrene is especially preferred.

Typical properties of a desirable commercially-available brominated polystyrene for use in preparing the pellets of this invention, where the polystyrene used was produced by free radical polymerization, include the following:

Appearance/form—off-white powder or granules formed by powder compaction
Bromine Content—68.5 wt %
Tg(° C.)—182
Specific gravity (@23° C.)-2.15
TGA (TA instruments model 2950, 10° C./min. under $N_2$):
1% weight loss, ° C.-346
5% weight loss, ° C.-375
10% weight loss, ° C.-383
50% weight loss, ° C.-399
90% weight loss, ° C.-435

Such brominated polystyrene is presently available from Albemarle Corporation under the designation SAYTEX® HP-7010P flame retardant. A powder-compacted granular form of such brominated polystyrene is presently available from Albemarle Corporation under the designation SAYTEX® HP-7010G flame retardant.

Typical properties of a preferred brominated anionic polystyrene for use in preparing the pellets of this invention include the following:

Appearance/form—white powder or pellet formed by melt extrusion of powder
Bromine Content—67 to 71 wt %
Melt flow index (220° C. 2.16 kg)—4 to 35 g/10 min
Tg(° C.)—170
Specific gravity (@23° C.)-2.2
TGA (TA instruments model 2950, 10° C./min. under $N_2$):
1% weight loss, ° C.-361
5% weight loss, ° C.-386
10% weight loss, ° C.-394
50% weight loss, ° C.-417
90% weight loss, ° C.-435

Methods for preparing brominated polystyrene having the above properties are described in U.S. Pat. No. 6,521,714. Brominated anionic polystyrene is presently available in the form of granules from Albemarle Corporation under the designation SAYTEX® HP 3010G flame retardant. Such granules are formed by melt extrusion of powder and are not prepared by the process of this invention. SAYTEX® HP 3010P flame retardant is the powder form of brominated anionic polystyrene produced by Albemarle Corporation.

Solvents

The solvents present in the solutions of brominated styrenic polymers used in the various embodiments of this invention can be any liquid solvent that is capable of being vaporized at a temperature below that at which the brominated styrenic polymer dissolved therein would begin to undergo thermal degradation, and that does not adversely react with the brominated styrenic polymer dissolved therein. Typically the solvent is composed of one or more halogenated solvents that have boiling temperatures below about 150° C. at atmospheric pressures. Typical halogenated solvents are those in which each halogen atom is a bromine atom or a chlorine atom or in which the solvent contains at least one bromine atom and at least one chlorine atom. Less preferred are solvents containing one or more halogen atoms other than bromine atoms and/or chlorine atoms. A feature of this invention is that the solvent can be the solvent in which the brominated styrenic polymer was formed by bromination of a styrenic polymer in the presence of a Lewis acid catalyst. Illustrative examples of such processes are set forth in the patents cited at the outset of this specification. However if desired, a solvent exchange procedure can be used to replace the initial solvent with a different vaporizable solvent at any suitable stage prior to feeding into a devolatilization extruder. The term "vaporizable" simply means that the solvent should boil at a temperature below that at which the particular brominated styrenic polymer dissolved therein would begin to undergo an unacceptable amount of thermal degradation. This temperature will of course vary from case to case depending upon such factors as the type of brominated styrenic polymer present in the solvent, the length of time the solution is at a threshold decomposition temperature, and the quality control specifications imposed upon the final brominated styrenic polymer product. Non-limiting examples of suitable organic solvents include dichloromethane, dibromomethane, bromochloromethane, bromotrichloromethane, chloroform, carbon tetrachloride, 1,2-dibromoethane, 1,1-dibromoethane, 1-bromo-2-chloroethane, 1,2-dichloroethane, 1,2-dibromopropane, 1-bromo-3-chloropropane, 1-bromobutane, 2-bromobutane, 2-bromo-2-methylpropane, 1-bromopentane, 1-bromo-2-methylbutane, 1-bromohexane, 1-bromoheptane, bromocyclohexane, and liquid isomers, homologs, or analogs thereof. Liquid mixtures of two or more such compounds can be used. Bromochloromethane is a particularly preferred solvent. If a solvent exchange procedure is used, such halogenated solvent can be replaced for example by a vaporizable liquid aromatic hydrocarbon solvent.

Drying and Concentrating Initial Solvent Solution

In the embodiments of this invention involving processes for recovery of brominated styrenic polymers as a melt or flow for subsequent use and in the embodiments of this invention involving processes for pelletizing brominated styrenic polymers where the solution contains some water, it is desirable to "dry" the solution by freeing it of most, if not essentially all, of the water. For example, when a reaction mixture is formed from Lewis acid-catalyzed bromination of a styrenic polymer in a suitable organic solvent such as halogenated hydrocarbon or halocarbon solvent, the catalyst is typically deactivated by quenching the reaction mixture with an aqueous quenching solution such as water by itself. After a phase cut to separate the organic phase of brominated styrenic polymer in organic solvent from the aqueous phase, some water typically remains in such organic phase. To remove such water the "wet" organic phase (i.e., organic phase which contains along with the brominated styrenic polymer, some residual amount of water, e.g., ca. 1500 ppm of water), is preferably passed through a coalescer to effect separation of at least a large portion of the free water, e.g., to a level of ca. 300 ppm or less of water). If the resultant "dried" solution of brominated styrenic polymer in the organic solvent contains less than about 40 wt % of brominated styrenic polymer, such solution is preferably subjected to distillation, more preferably a flash distillation, to remove organic solvent as a collectable vapor phase along with any water retained by the polymer solution. In this way a more concentrated essentially anhydrous organic solution containing at least about 50 wt % of brominated styrenic polymer is formed. Such more highly concentrated solution is ideally suited for use as the feed to the devolatilization extruder.

The technology for coalescing filtration, including coalescing filtration for separating water from organic liquid systems, is well known and reported in the literature, and systems for separating water from organic liquid systems are available from various commercial suppliers. Suitable filter media for effecting such separations include fiberglass, ceramics, and sand. The use of a bed of sand is a preferred medium for use in embodiments of the present invention in which coalescing filtration is to be employed.

Recovery of Brominated Styrenic Polymers from Solvent

In the various processes of this invention for recovering brominated styrenic polymers from a solution in an organic solvent, some of which processes have been described above, the product as initially recovered from the devolatilization extruder is in the form of a melt or is in at least a soft flowable form. The melt can be cooled or allowed to cool and then can be converted (e.g., by molding) into various shapes or configurations for storage and shipment or it can be pulverized into particulate form or fine powder form. In order to convert the polymer melt or polymer flow directly into pelletized form, use of the process embodiment of this invention devoted to preparing pelletized brominated styrenic polymers is especially preferred. However, if desired, the pelletizing process described in commonly-owned published PCT patent application WO 2005/118245 can be used from dry powdered brominated styrenic polymer as pellets made by that process are of good quality. However, based on available test results, pellets made pursuant to this invention are even better than those produced according to WO 2005/118245, especially in hardness and/or high crush strength.

Recovery of brominated styrenic polymers from solution by an embodiment of this invention involves selection and operation of a devolatilization extruder in a suitable manner such as described herein so that the solvent is vaporized in and can be, and preferably is, collected from the extruder. Preferably the recovered solvent is reused by recycling to a process in which styrenic polymer is brominated using a Lewis acid catalyst. In an especially preferred embodiment of this invention a process is provided comprising conducting the bromination of a styrenic polymer in a liquid phase reaction mixture under superatmospheric pressure in a closed reaction system so that gaseous hydrogen halide (HX, where X is a bromine or chlorine atom) coproduct is not released from said closed reaction system separately and apart from such reaction mixture until the reaction has been terminated by quenching the reaction mixture in an aqueous quenching medium which destroys the catalyst and dissolves the HX forming hydrobromic acid or if BrCl is used as the brominating agent, hydrochloric acid. The organic phase containing the brominated styrenic polymer and the aqueous phase containing the HX are separated from each other by a phase separation procedure such as settling and draining off the lower phase or siphoning off the upper phase. Preferably additional aqueous washes are carried out to more completely remove residual HX and any inorganic salts that may be present. If desired, the organic phase may be subjected to coalescing filtration to achieve essentially complete separation of the aqueous phase from the organic phase. After concentrating the organic phase containing the brominated styrenic polymer, the more concentrated organic phase is then introduced into a devolatilization extruder wherein the solvent is vaporized and recovered, and a melt or polymer flow of the essentially solvent free brominated styrenic polymer is released from the extruder. In cases where HX in the aqueous phase is HBr, it is preferred to thereafter recover the bromine values from the aqueous phase by (i) steam stripping the aqueous phase to remove residual organic solvent from the aqueous phase and thereby provide a hydrobromic acid product suitable for use or sale; (ii) converting the HBr in the aqueous phase to elemental bromine; or (iii) reacting the HBr with an aqueous metallic base to produce a solution of a metal bromide salt suitable for use or sale.

Thus in accordance with another embodiment of this invention there is provided a process for the preparation of a brominated styrenic polymer, typically having a bromine content of at least about 50 wt %, and preferably at least about 60 wt %, and still more preferably at least about 67 wt % in the form of a melt or polymer flow, which process comprises:
- brominating a styrenic polymer under superatmospheric pressure in a vaporizable solvent and in the presence of a Lewis acid bromination catalyst, and in a closed reaction system in which substantially all of the hydrogen halide coproduct is retained in the reaction mixture;
- quenching the catalyst to thereby form (i) an organic phase containing dissolved brominated styrenic polymer, and (ii) an aqueous phase containing hydrogen halide;
- separating phases (i) and (ii) from each other, using coalescing filtration, if desired, to attain essentially complete separation of phases, and if phase (i) has a viscosity less than extrudable viscosity, concentrating organic phase of (i) to form and admixture of extrudable viscosity, such concentration preferably being accomplished by use of distillation or flash distillation;
- continuously introducing organic phase of (i) or admixture of extrudable viscosity into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections; and
- operating said section disposed downstream at higher temperature and lower pressure conditions than the temperature and pressure conditions of said section disposed upstream, so that (a) a flowable polymer melt or polymer flow of said polymer is formed within the devolatilization extruder and released from the at least one polymer melt or polymer flow outlet, and (b) volatiles composed predominately of the solvent released from the polymer in said at least two sections can be, and preferably are, collected by said vapor collecting apparatus, the polymer melt or polymer flow of such brominated styrenic polymer leaving from the outlet portion of the devolatilization extruder containing an average of less than about 10,000 ppm (wt/wt), and preferably less than about 5000 ppm (wt/wt), and still more preferably less than about 1000 ppm (wt/wt) of the organic solvent during steady-state operation.

The quenching in the above embodiment can be conducted in the reactor in which a batch of the brominated styrenic polymer has just been prepared or more preferably in a separate vessel. When the bromination is conducted on a continuous basis, the bromination reaction product is continuously transmitted while under pressure into a separate vessel or zone and into contact in such vessel or zone with an aqueous quenching medium, preferably water. During the quenching the catalyst residues tend to collect in the aqueous phase and essentially all of the hydrogen halide is taken up in the water. After conducting the phase separation between (i) and (ii) in the above embodiment and before effecting the introduction into the liquids inlet portion of the devolatilization extruder, it is preferable to subject the organic phase of (i) to coalescing filtration in order to remove entrained water containing dissolved salt(s) from the organic phase containing the brominated styrenic polymer.

Production of Pellets

Among the various embodiments of this invention is a process for producing pelletized brominated styrenic polymers from an admixture of brominated styrenic polymer and a vaporizable solvent, which process comprises:
- optionally forming an admixture of extrudable viscosity comprising brominated styrenic polymer and a vaporizable organic solvent, preferably a vaporizable halogenated organic solvent, from a less concentrated admixture thereof having a brominated styrenic polymer content of 40 wt % or less, the vaporizable organic solvent preferably being a halogenated solvent in which the brominated styrenic polymer was formed by bromination of a styrenic polymer in the presence of a Lewis acid catalyst;
- continuously introducing an admixture of extrudable viscosity comprising brominated styrenic polymer and a vaporizable organic solvent, into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections;
- operating said section that is disposed downstream at higher temperature and lower pressure conditions than the temperature and pressure conditions of said section that is disposed upstream, so that (a) a flowable melt or flow of said polymer is formed within the devolatilization extruder and forcibly released from the polymer melt or polymer flow outlet, and (b) volatiles composed predominately of the solvent released from the polymer in said at least two sections can be, and preferably are, collected by said vapor collecting apparatus, the polymer melt or polymer flow of such brominated styrenic polymer that exits from the outlet portion of the devolatilization extruder containing an average of less than about 10,000 ppm (wt/wt), and preferably less than about 5000 ppm (wt/wt), and still more preferably less than about 1000 ppm (wt/wt) of the organic solvent in steady-state operation;
- having the polymer melt or polymer flow from the devolatilization extruder pass through a die to produce traveling strand(s) of extruded polymer melt or polymer flow;
- enabling and/or causing such traveling strand(s) to solidify (e.g., by enabling and/or causing a sufficient reduction in the temperature of the traveling strand(s)) and be broken, subdivided, or otherwise converted into pellets of the brominated styrenic polymer (e.g., by providing a vacuum system under the conveyor belt or web to draw air downwardly over and around the strands on the web, and by applying jets of water downwardly onto the strands traveling on the conveyor belt or web of sufficient force to cause at least some breakage of the strands, the porosity of the belt or web allowing the water to pass downwardly through the web but of fine enough porosity to retain the broken, subdivided, or pelletized polymer strands on the belt or web and enabling and/or causing broken, subdivided, or pelletized polymer strands to fall from the belt or web into a size classifier whereby the impact from the fall may cause some additional breakage of strand pieces to occur);

subjecting the pellets to size classification (e.g., by use of appropriate screening techniques) to remove and recover from such product (a) oversized particles, if any, and (b) fines, if any, that may be present in such product.

In the above process it is preferred to collect oversized particles and fines that may result from the size classification and recycle them for example into the liquids inlet portion of the devolatilization extruder, to any other suitable inlet in an upstream portion of such extruder, or to the polymer melt or polymer flow passing into the die so that the particles and fines become part of the polymer melt or polymer flow. When using the above optional first step, it is preferable to subject the less concentrated solution to flash distillation to thereby form the desired more concentrated solution, and also to recycle halogenated solvent collected by the vapor collecting apparatus of the devolatilization extruder as at least part of the solvent used in ensuing bromination of styrenic polymer.

Still another embodiment of this invention is a process for producing pelletized brominated styrenic polymers, which process comprises:

feeding a solution containing at least about 50 wt % of brominated styrenic polymer dissolved a vaporizable solvent into a devolatilization extruder that is adapted and operated to separate vaporizable solvent from said polymer and form as extrudate a polymer melt or polymer flow of said polymer;

having the extrudate pass through a die to thereby form one or more traveling strands of molten unadulterated brominated styrenic polymer, preferably unadulterated anionic styrenic polymer; and pelletizing such strands by enabling and/or causing such traveling strand(s) to solidify (e.g., by enabling and/or causing a sufficient reduction in the temperature of the traveling strand(s)) and be broken, subdivided, or otherwise converted into pellets of the brominated styrenic polymer (e.g., by providing a vacuum system under the conveyor belt or web to draw air downwardly over and around the strands on the web, and by applying jets of water downwardly onto the strands traveling on the conveyor belt or web of sufficient force to cause at least some breakage of the strands, the porosity of the belt or web allowing the water to pass downwardly through the web but of fine enough porosity to retain the broken, subdivided, or pelletized polymer strands on the belt or web and enabling and/or causing broken, subdivided, or pelletized polymer strands to fall from the belt or web into a size classifier whereby the impact from the fall may cause some additional breakage of strand pieces to occur); and subjecting the pellets to size classification (e.g., by use of appropriate screening techniques) to remove and recover from such product (a) oversized particles, if any, and (b) fines, if any, that may be present in such product.

Yet another embodiment of this invention is a process for the preparation of a pelletized brominated styrenic polymer typically having a bromine content of at least about 50 wt %, and preferably at least about 60 wt %, and still more preferably at least about 67 wt % in the form of a polymer melt or polymer flow, which process comprises:

brominating a styrenic polymer under superatmospheric pressure in a vaporizable solvent and in the presence of a Lewis acid bromination catalyst, and in a closed reaction system in which substantially all of the hydrogen halide coproduct is retained in the reaction mixture;

quenching the catalyst to thereby form (i) an organic phase containing dissolved brominated styrenic polymer having a bromine content as aforesaid and (ii) an aqueous phase containing hydrogen halide;

separating such phases from each other, and preferably subjecting the organic phase containing dissolved brominated styrenic polymer to a coalescing filtration;

concentrating the organic phase containing dissolved brominated styrenic polymer to a viscosity suitable for use in a devolatilization extruder;

continuously introducing organic phase containing dissolved brominated styrenic polymer into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections;

operating said section disposed downstream at higher temperature and lower pressure conditions than the temperature and pressure conditions of said section disposed upstream, so that (a) a flowable polymer melt or polymer flow of said polymer is formed within the devolatilization extruder and released from the polymer melt or polymer flow outlet, and (b) volatiles composed predominately of the solvent released from the polymer in said at least two sections can be, and preferably are, collected by said vapor collecting apparatus, the polymer melt or polymer flow of such brominated styrenic polymer that has exited from the outlet portion of the devolatilization extruder containing an average of less than about 10,000 ppm (wt/wt), and preferably less than about 5000 ppm (wt/wt), and still more preferably less than about 1000 ppm (wt/wt) of the organic solvent in steady-state operation;

having the polymer melt or polymer flow from the devolatilization extruder pass through a die to produce traveling strand(s) of extruded polymer melt or flow;

enabling and/or causing such traveling strand(s) to solidify (e.g., by enabling and/or causing a sufficient reduction in the temperature of the traveling strand(s)) and be broken, subdivided, or otherwise converted into pellets of the brominated styrenic polymer (e.g., by providing a vacuum system under the conveyor belt or web to draw air downwardly over and around the strands on the web, and by applying jets of water downwardly onto the strands traveling on the conveyor belt or web of sufficient force to cause at least some breakage of the strands, the porosity of the belt or web allowing the water to pass downwardly through the web but of fine enough porosity to retain the broken, subdivided, or pelletized polymer strands on the belt or web and enabling and/or causing broken, subdivided, or pelletized polymer strands to fall from the belt or web into a size classifier whereby the impact from the fall may cause some additional breakage of strand pieces to occur); and subjecting the pellets to size classification (e.g., by use of appropriate screening techniques) to remove and recover from such product (a) oversized particles, if any, and (b) fines, if any, that may be present in such product.

Devolatilization Extruder

In conducting the various processes of this invention, commercially available devolatilization extruders can be successfully adapted for use in practicing such processes. The extruder can be of single screw configuration, co-rotating twin screw configuration, or counter-rotating twin screw configuration. Twin screw non-intermeshing counter-rotating devolatilization extruders are preferred. The machine should be equipped with a liquids inlet portion at the feed portion of the extruder and a polymer melt or flow outlet portion at the discharge portion of the extruder. It should also have along the length of the screw(s) at least two housing sections, and preferably four or more housing sections, that can be independently operated (a) at temperatures (preferably adjustable temperatures) that differ from each other and (b) pressures (preferably adjustable pressures) that differ from each other. At least some of the midstream or downstream sections must be able, and preferably all of the sections should be able, to provide internal temperatures high enough to form a polymer melt or polymer flow of the brominated styrenic polymer(s) to be used in the machine. Typically varying temperatures of up to about 350° C. will suffice. The heat generated by friction within the machine should of course be taken into consideration in setting the temperatures of the segments or zones in which the polymer melt or polymer flow is being processed by the machine. Also at least some of the midstream or downstream sections, and preferably all of the sections, should be adapted to independently operate at reduced pressures in the range of about 1 to about 500 mm of Hg. The devolatilization extruder should be used in conjunction with vapor collecting apparatus adapted to collect all volatiles formed in each of the sections. The pitch of the forward-flighted screw elements should be adapted to provide a continuous flow of the contents of the extruder to maximize production rate. If necessary, or desirable, because of the characteristics of the particular brominated styrenic polymer to be processed, the screw elements may also contain reverse-flighted elements for more intensive mixing and/or cylindrical elements to create a seal. The manufacturers of such machines can adapt the type and/or pitch of the screws to achieve satisfactory rates of flow and mixing once they are provided with samples of the particular brominated styrenic polymer to be processed in a suitable devolatilization extruder. Continuous operation of the devolatilization extruder is the especially preferred mode of operation, although it is possible to practice at least some of the processes of this invention, e.g., processes for recovery of brominated styrenic polymers from solutions, as batch operations.

Use may be made of devolatilization extruder machines provided by commercial manufacturers of such equipment.

For anyone unfamiliar with extruders including devolatilization extruders, their design and their operation, reference may be made to Chris Rauwendaal, *Polymer Extrusion,* 4th Edition, Hanser Gardner Publications, Inc., Cincinnati, Ohio for further details known and available to those of ordinary skill in that art. See also U.S. Pat. Nos. 3,082,816 and 4,110, 843.

Illustrative Preferred Process Embodiment

A devolatilization extruder is operated at a suitable temperature and pressure profile to cause the brominated anionic styrenic polymer to be substantially freed of solvent in the initial upstream section(s) and to become at least highly softened if not molten in the midstream and/or downstream section(s). The temperature profile used will thus vary somewhat depending on the makeup of the brominated anionic styrenic polymer being processed.

The extrudate from the machine is passed through a die plate and the resultant continuous strands are allowed to drop onto a moving porous conveyor belt.

The contents of the belt and any former contents of the conveyor belt that may be emerging from the end of the conveyor belt are caused to drop into a classifier which separates the pellets and the fines from each other. Such droppage onto the classifier may also cause some breakage to occur. The classifier can include, for example, an essentially horizontally disposed mesh which is caused to vibrate back and forth longitudinally. A particularly suitable machine of this type is a Vibratory Classifier such as is available from The Witte Company, Inc.

In a typical operation, the conveyor belt used is about 14 feet in length and is operated at a speed in the range of about 100 to about 200 ft/min. The forced air and the water used in the misting of the strands are typically at ambient room temperatures, but can be heated if desired so as to reduce heat shock. The distance of the drop from the end of the conveyor belt to the screen of the classifier is typically in the range of about 18 to about 36 inches.

In any of the properly conducted pelletizing processes of this invention using as the feed to the devolatilization extruder a 50 wt % solution in bromochloromethane of brominated anionic polystyrene, which brominated anionic polystyrene has a bromine content of at least 50 wt % (preferably at least 60 wt %, and more preferably at least 67 wt %), it should be possible to produce a product in which no more than about 5 wt %, preferably no more than about 3 wt %, and more preferably no more than about 1 wt % are fines or dusts that pass through a standard U.S. No. 40 sieve. Thus, the pelletizing processes of this invention are highly efficient; only small amounts of such fines are collected and preferably recycled in the overall pelletizing operation.

Turning now to the Drawings, FIG. 1 depicts in block diagram format many of the steps included in preferred process operations of this invention from which some or all of the depicted steps may be used, depending upon the particular embodiment being utilized. The sequence shown in FIG. 1 is typical, but suitable changes or additions can be made in the sequence such as insertion of separation steps, washing steps, or other like processing steps, not shown in FIG. 1. Thus, as long as devolatilization as at IX is conducted, an embodiment of this invention can start at any stage at or above IX, and stages above and/or below IX can be inserted or omitted from the sequence depicted as long as a result pursuant to this invention is achieved. As seen from FIG. 1, some embodiments of this invention start with I, bromination of styrenic polymer to form brominated styrenic polymer. Optionally hydrogen halide (HBr or HCl) co-product may be removed from the reaction mixture. Alternatively the hydrogen halide co-product is kept in the reaction mixture to serve as a co-solvent. When the desired extent of bromination has been achieved, the aromatic bromination reaction is terminated as at II, by addition of a suitable quantity of water to deactivate the catalyst. When the hydrogen halide co-product has been kept with the reaction mixture, this catalyst deactivation is accomplished in a closed system operating under pressure to retain the hydrogen halide co-product with the reaction mixture when such technique is being used instead of venting and collecting this co-product earlier in the operation. In either case the reaction mixture with all or only a portion of the co-product HX is quenched, with water or water containing other components such sodium sulfite as at III. The hydrogen halide can be recovered as hydrobromic acid or hydrochloric acid. Use of the sequence of II and III is preferred. However, it is possible to eliminate II and conduct quenching as at III by pumping the reaction mixture into water or aqueous sodium sulfite. The aqueous and organic phases are separated as at IV. The organic phase containing the brominated styrenic polymer can then be washed with aqueous base such as aqueous sodium hydroxide solution as at V, to remove residual HBr and/or HCl.

In some preferred embodiments, it is desirable to subject the organic phase which typically consists essentially of a solution of up to about 40 wt % of brominated styrenic polymer in organic solvent plus some residual water and salts, to coalescing filtration as at VI, to remove entrained water and dissolved salts from the organic phase. In some embodiments of this invention the processing of such organic phase is continued. In other embodiments an organic phase typically consisting essentially of a solution of up to about 40 wt % of brominated styrenic polymer in organic solvent and which may or may not have been subjected to coalescing filtration, is used as a starting material for devolatilizing extrusion. In any such case, such an organic phase is concentrated as at VII, to form an admixture of extrudable viscosity typically by distillation or flash distillation to remove a suitable portion of the organic solvent from the organic phase mixture. Preferably, solvent removed from the mixture is recovered for reuse. In embodiments where an initial organic phase mixture is of a brominated styrenic polymer of sufficiently high molecular weight as to yield a mixture which already is of extrudable viscosity, such concentration step of VII may be eliminated. Before processing the admixture of extrudable viscosity to effect devolatilization in a devolatilization extruder, it is desirable to preheat the admixture as at VIII. Such preheating can be conducted in a devolatilization extruder if equipped with preheating section, or in a separate preheater vessel or zone if the devolatilization extruder is not equipped with a preheating section. Such preheating typically facilitates operation of the devolatilization extruder, and is thus preferably utilized in the process.

Figure 2:
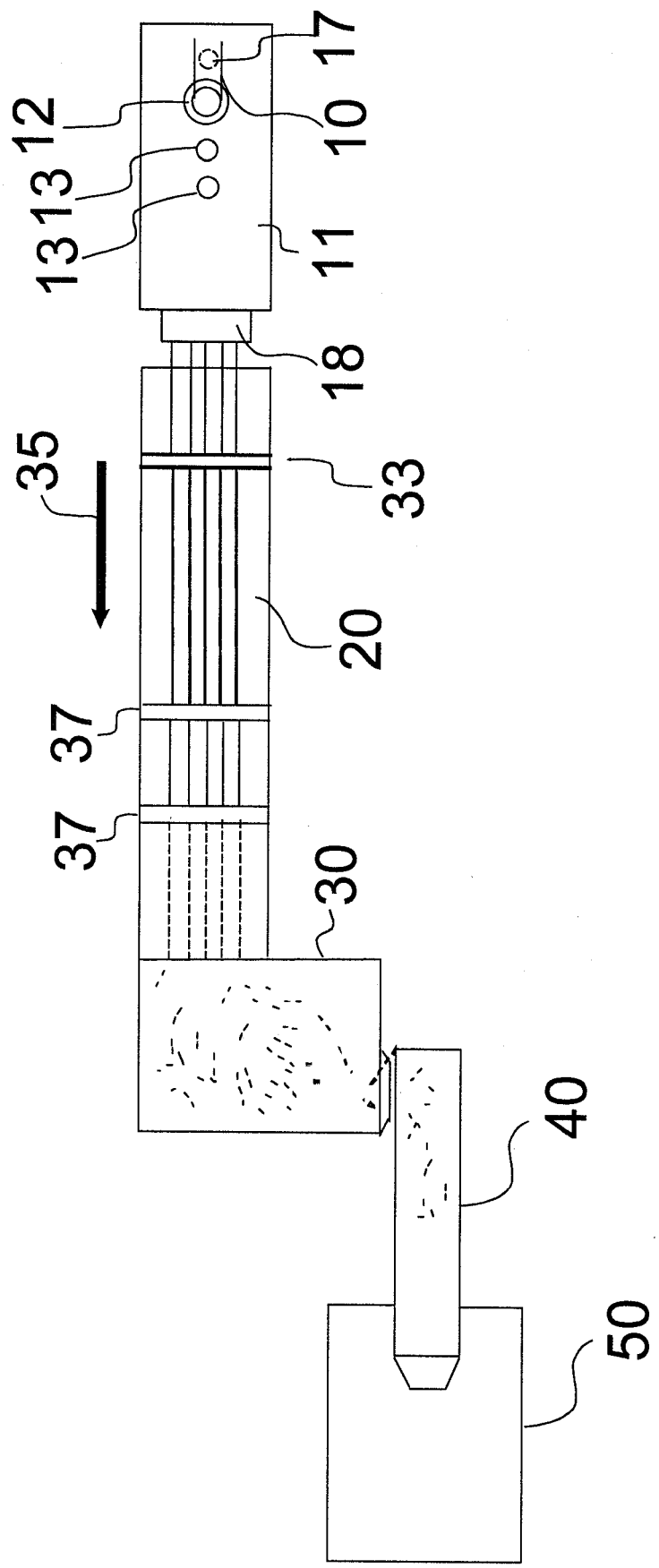
FIG. 2 is a schematic top view of a mechanical system suitable for producing pursuant to the processes of this invention, pelletized unadulterated brominated styrenic polymers and preferably, pelletized unadulterated brominated anionic styrenic polymers, of this invention.
Figure 3:
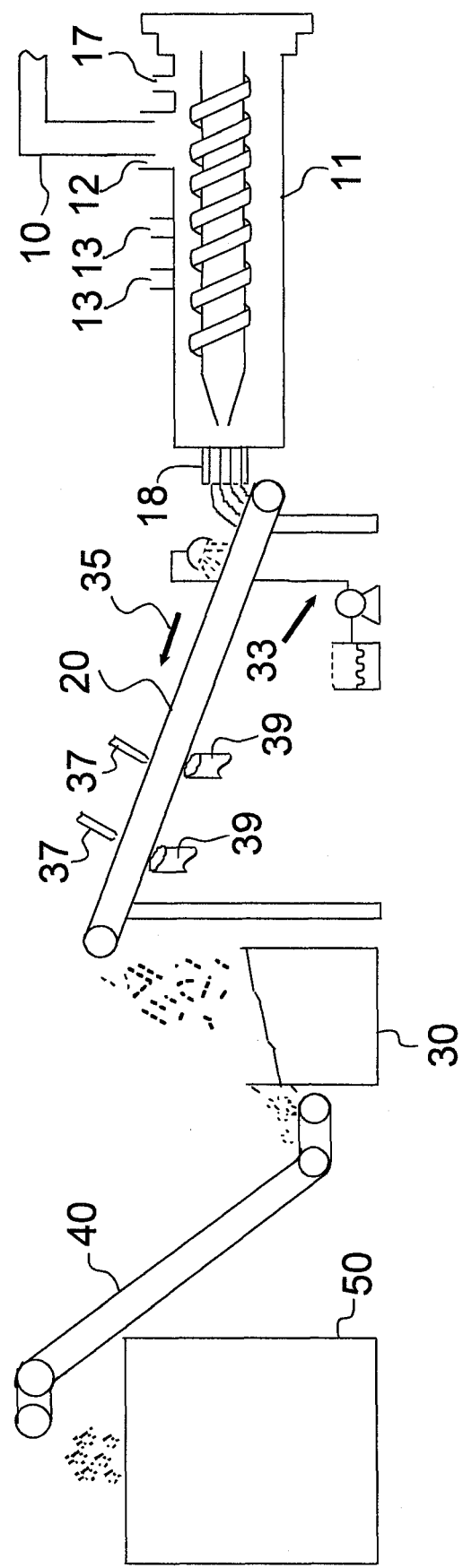
FIG. 3 is a schematic side view of the system of FIG. 2.

In some embodiments of this invention the processing of such admixture of extrudable viscosity is continued after conducting V, VI, or VII, whereas in other embodiments such an admixture is used as a stating material. In any such case, an admixture of extrudable viscosity, preferably after at least formed via concentration as at VII, is processed in a devolatilization extruder as at IX, to form a melt or flow of brominated styrenic polymer and a separate vapor phase of organic solvent which preferably is recovered and condensed for reuse as a solvent. Then the melt or flow is subjected to product recovery as at X-A or subjected to pelletizing as at X-B, or a portion of the melt is subjected to product recovery as at X-A and another portion (typically all the rest of the melt or flow) is subjected to pelletizing as at X-B. Product recovery as at X-A can be as simple as collecting or recovering melt or flow of brominated styrenic polymer from a devolatilization extruder. FIGS. 2 and 3 illustrate a preferred way of carrying out the pelletizing operation.

Referring now to a preferred system involving pellet formation as schematically depicted in FIGS. 2 (top view) and 3 (side view) wherein like numerals depict like parts, an admixture of extrudable viscosity comprising brominated styrenic polymer, preferably brominated anionic styrenic polymer, typically containing at least 50 wt % of bromine and a solvent, preferably a halogenated solvent, is fed from line 10 into inlet 12 of devolatilization extruder 11 equipped with a preheater section (not shown). If the devolatilization extruder 11 is not so equipped, the admixture is preferably fed to a separate preheater or preheater zone (not shown). In either such case the admixture is preferably preheated to a temperature in the range of about 165 to about 185° C., and then processed in the devolatilization extruder so that the admixture is devolatilized, e.g., substantially freed of halogenated solvent and other volatile substances that may be present, by application of sufficient heat and reduced pressure. Depending on the design of devolatilization extruder 11, most of the volatiles may be discharged through a vent located to the rear of inlet 12. In any event, further downstream in devolatilization extruder 11, the contents of the extruder achieve a flowable semi-solid state as a polymer melt and/or a polymer flow of the brominated styrenic polymer and the melt or flow is discharged through die 18 whereby strands, typically continuous strands, of the polymer are extruded from the die onto moving conveyor belt 20. In the system depicted, belt 20 is upwardly inclined such that the remote end of the upper portion of the belt is typically about 18 to about 36 inches above vibratory classifier 30. Spray system denoted generally as 33 forms and dispenses a mist or spray of water onto the hot polymer strands on the upper portion of belt 20 which is traveling in the direction shown by arrow 35. The cooled strands are then carried by belt 20 under air knives 37,37 which cut or break at least a portion of the strands into pellets. At the underside of belt 20 in proximity to the location of air knives 37,37 are vacuum inlets 39,39 of a conventional vacuum manifold system (not shown) which draws off residual water and fines from the underside of belt 20. The resultant pellets are discharged at the upper outer end of belt 20 and fall under the influence of gravity onto the operative upper surface of classifier 30 which can be a vibratory classifier. The impact of the fall can result in formation of addition pellets through breakage of larger pieces falling from belt 20. Thus the pellets in the system depicted in FIGS. 2 and 3 are mainly formed in the region extending from the air knives 37,37 to and including classifier 30. Fines are separated by and collected within classifier 30 which continuously transfers the pellets remaining after the separation onto transfer device 40 such as a segmented conveyor or bucket elevator disposed to receive and convey the pellets forwardly and upwardly to an elevation suitable for feeding the pellets to a suitable heavy duty packaging container 50, such as a Supersack or Gaylord container. If any fines are formed in such packaging step due to pellet breakage, it can be minimized or eliminated by reduction in the height of the fall from the transfer device to the packaging container.

Figure 4:
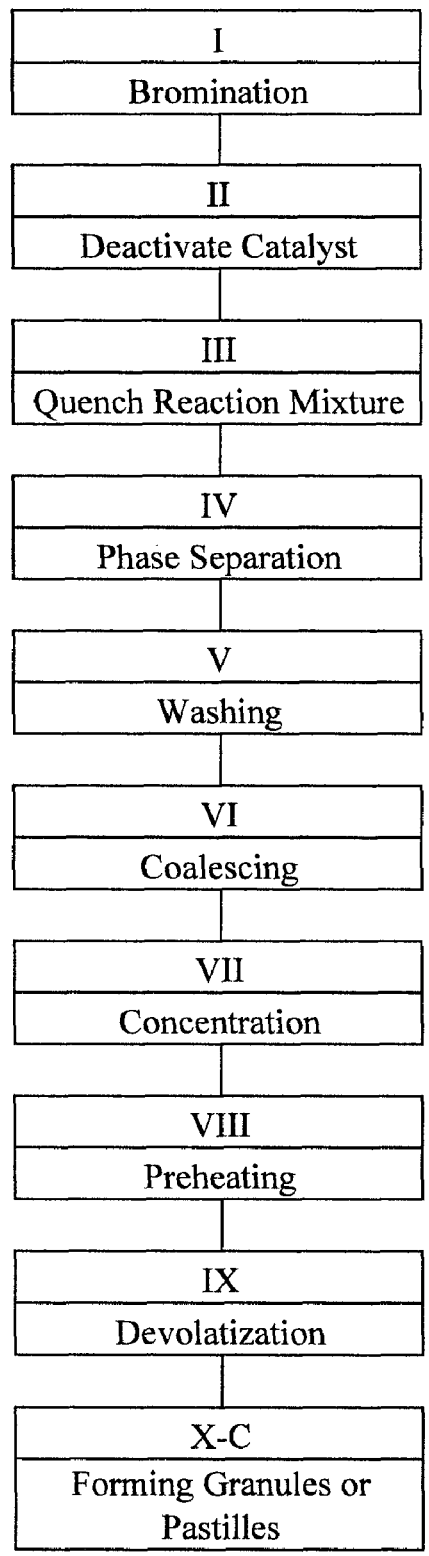
FIG. 4 is a block diagram illustrating an overall process of this invention for the preparation of granules or pastilles of unadulterated brominated styrenic polymers.

FIG. 4 of the drawings illustrates a preferred sequence of steps utilizing an overall process of this invention in which granules or pastilles of unadulterated brominated styrenic polymers are produced. The above description relative to FIG. 1 as regards forming pellets applies equally well to FIG. 4, except for the last step. In FIG. 4, the last step involves forming granules or pastilles using appropriate procedures and apparatus.

The combination of devolatilization followed by forming granules or pastilles using apparatus such as is available in the open market provides a number of important technical and economic advantages. In the first place, use of this combination of operations eliminates the need for a very large scale (e.g., 16,000 gallon) precipitation vessel in which the brominated anionic styrenic polymer is precipitated from the reaction mass in hot water. Also eliminated are other associated items such as a centrifuge for recovering the solids from the liquid phase and a large scale dryer for drying the product. Elimination of such large scale equipment also enables the overall process to be operated in a smaller space. In addition, operating costs including heat energy requirements are significantly reduced, substantial portions of the solvent used in the process (i.e., that coming from the devolatilization extruder) can be recycled without drying, and the overall process has the additional capability of purging volatile impurities or coproducts from the heavy ends formed in the process. For example, during continuous or repetitive batch operations, a small portion of the solvent, preferably bromochloromethane, becomes converted into dibromomethane and it is highly advantageous to purge this material at least periodically from the solvent being recycled in the process.

Illustrative of commercially-available apparatus that can be adapted for use in forming the granules or pastilles is the system available from Kaiser Steel Belt Systems GmbH designated as Pastillation System Rollomat®. Equipment of this type and its operation is not only described in promotional material available from Kaiser Steel Belt Systems GmbH, but also in U.S. Pat. Nos. 5,198,233 and 5,278,132.

Analytical Procedures

If deemed necessary or desirable, any reliable analytical procedure such as reported in the literature can be employed in determining such analysis or properties. In any doubtful or disputed case, the following procedures are recommended:

1) Bromine Content—Since brominated styrenic polymers have good, or at least satisfactory, solubility in solvents such as tetrahydrofuran (THF), the determination of the total bromine content for a brominated styrenic polymer is easily accomplished by using conventional X-Ray Fluorescence techniques. The sample analyzed is a dilute sample, say 0.1±0.05 g brominated polystyrene in 60 mL THF. The XRF spectrometer can be a Phillips PW1480 Spectrometer. A standardized solution of bromobenzene in THF is used as the calibration standard.

2) Crush Strength—The Crush Strength Test utilizes a Sintech® 1/S compression apparatus (MTS Systems Corporation, Edenprairie, Minn.) equipped with Testworks software, which software is installed in the 1/S compression apparatus as supplied by MTS Systems Corporation. The 1/S compression apparatus includes a horizontal load cell interfaced with a computer, a digital micrometer also interfaced with the computer, and a vertical screw-driven piston that is disposed above the load cell and adapted to apply a downward force perpendicular to the load cell. The procedure for measuring crush strength involves measuring the length of the pellet with the micrometer to provide a digitized input to the computer. Next the pellet is placed on its end on the load cell with the piston in contact with the upper edge of the pellet. Then the apparatus is activated whereby the piston commences applying a progressively increasing downward force to the pellet. At the same time, the load cell continuously measures the downward force being applied to the pellet, and the input of such measurements is transmitted to the computer. When the force being applied reaches the point where the amount of force suddenly decreases to 10% of the immediately preceding force, the pellet has reached the breaking point, and the application of the force is immediately terminated by the software program. From the inputs to the computer, two values are provided, namely the pounds of force at the breaking point of the pellet, and the pounds of force per inch of length of the pellet at the breaking point. Thus the greater the force applied, the greater the crush strength. In the test 13 pellets are selected at random and used in the test. The only qualification is that the selected pellets should have flat end portions so as to rest flatly on, and stand vertically in, the load cell and with the flat upper end fitting flatly against the lower surface of the piston.

3) Molecular Weight and Polydispersity—Molecular weight values of styrenic polymers are obtained by GPC using a Waters model 510 HPLC pump and, as detectors, a Waters Refractive Index Detector, Model 410 and a Precision Detector Light Scattering Detector, Model PD2000, or equivalent equipment. The columns are Waters, μStyragel, 500 Å, 10,000 Å and 100,000 Å. The autosampler is a Shimadzu, Model Sil 9A. A polystyrene standard ($M_w$=185,000) is routinely used to verify the accuracy of the light scattering data. The solvent used is tetrahydrofuran, HPLC grade. The test procedure used entails dissolving 0.015-0.020 g of sample in 10 mL of THF. An aliquot of this solution is filtered and 50 μL is injected on the columns. The separation is analyzed using software provided by Precision Detectors for the PD 2000 Light Scattering Detector. The instrument provides results in terms of weight average molecular weight and also in terms of number average molecular weight. Thus, to obtain a value for polydispersity, the value for weight average molecular weight is divided by the value for number average molecular weight.

4) To determine the amount of organic solvent retained in a brominated styrenic polymer sample, proton NMR spectra are acquired using a Bruker DPX 400 MHZ instrument for solutions of about 20 wt % brominated styrenic polymer in 5/2 volume ratio carbon disulfide/dichloromethane-$d_2$ (one 30 degree pulse experiment, 8 scans and 15 second pulse delay). The integrals of the brominated styrenic polymer are obtained along with the integral(s) for the organic solvent component. Using the appropriate molecular weight values with such integral(s), the amount of the organic solvent in the polymer is calculated.

Continuous Processes

While the processes of this invention can be conducted as batch processes wherein a given quantity of feed materials are processed and then the operation is shut down, it is preferred to conduct the processes of this invention on a continuous basis where only periodically is the operation shut down e.g., for equipment repair or maintenance. Preferred continuous processes of this invention produce either highly pure melts or flows of brominated free radical styrenic polymer or highly pure pellets of brominated free radical styrenic polymer. Especially preferred continuous processes of this invention produce either highly pure melts or flows of brominated anionic styrenic polymer or highly pure pellets of brominated anionic styrenic polymer. Common to these continuous processes are some or all of the operations described in block diagram form in FIG. 1.

Pellets of the Invention

Pursuant to this invention, pelletized brominated styrenic polymers are produced having little, if any, fine particles or dusts.

Novel pellets of this invention are composed of unadulterated brominated anionic styrenic polymer, preferably unadulterated brominated anionic polystyrene, having the following characteristics:

A) a bromine content of at least about 50 wt %, preferably at least about 60 wt %, more preferably at least about 64 wt %, and still more preferably in the range of about 67 to about 71 wt %;

B) an average crush strength in the Crush Strength Test of at least about 28 pounds per square inch, and preferably of at least about 32 pounds per square inch;

C) a particle size range in which at least about 70 wt %, and preferably at least about 75 wt %, of the pellets are retained on a standard U.S. Pat. No. 40 sieve and no more than about 30 wt % and preferably no more than about 25 wt %, are retained on a standard U.S. Pat. No. 5 sieve.

More preferably at least about 80 wt %, still more preferably at least about 85 wt %, and even more preferably at least about 90 wt %, of the pellets are retained on a standard U.S. No. 40 sieve and, respectively, more preferably no more than about 20 wt %, still more preferably no more than about 15 wt %, and even more preferably no more than about 10 wt %, are retained on a standard U.S. No. 5 sieve.

Granules or Pastilles Producible by Use of this Invention

To simulate a process of this invention, pastilles were produced and subjected to tests to determine their crush strength. Using a Rollormat pastillation system, (Kaiser Steel Belt Systems) brominated anionic polystyrene having a bromine content of approximately 68% and a melt flow index at 220° C. and 2.16 kilogram load of 4 to 35 grams per 10 minutes was subjected to pastillation. Substantially uniform pastilles were formed and solidified on the water-cooled traveling steel belt. A sample of these pastilles was collected for determination of physical properties. In particular, tests were conducted to measure both the height of 13 randomly selected pastilles produced in the process just described and the crush strength of the selected pastilles. The apparatus used in these tests was a Sintech 1/S instrument. The procedure used involved the following:

1) randomly selecting 13 pastilles from the sample undergoing the test and measuring the height of each pastille from its flat base to the peak of its dome;
2) placing a pastille on the stationary unpadded steel plate of the instrument such that the flat surface of the pastille rests on the steel plate with the peak of the dome of the pastille directly below the moveable crosshead of the instrument upon which a 50 pound load cell is attached. Attached to the load cell is a cylindrical shaft which is flat on its lower end that will come in direct contact with the peak of the dome of the pastille;
3) lowering the crosshead to within 0.002 inch of the peak of the dome;
4) lowering the crosshead by the motorized screw drive of the instrument at the rate of 0.2 inch per minute until the pastille is crushed at which point the maximum load is recorded, and the crush strength in pounds per inch is calculated.

The above procedure is repeated individually with each of the 13 randomly selected pastilles from the sample of pastilles undergoing the test. The crush strength is determined in each of the respective 13 cases by dividing the maximum load (in pounds) by the height (in the fraction of an inch) of the respective pastille subjected to the test.

Table 1 summarizes the results of the 13 individual tests, the average values achieved, the standard deviations of the values achieved, and the minimum and maximum values achieved in the test. In Table 1, the granules or pastilles are referred to simply as pastilles for economy of space. The abbreviations used and their full meaning are as follows: in. stands for inch; lbs stands for pounds force; Avg. stands for average; Std. Dev. stands for standard deviation; Min. stands for minimum; and Max. stands for maximum.

TABLE 1

| Pastille No. | Pastille Height, inches | Peak Load Applied, pounds | Energy to Crush, lbs/in. |
| --- | --- | --- | --- |
| 1 | 0.207 | 12.97 | 62.66 |
| 2 | 0.213 | 7.56 | 35.49 |
| 3 | 0.219 | 14.52 | 66.30 |
| 4 | 0.208 | 10.23 | 49.18 |
| 5 | 0.213 | 9.26 | 43.47 |
| 6 | 0.199 | 8.00 | 40.20 |
| 7 | 0.224 | 7.34 | 32.77 |
| 8 | 0.207 | 14.67 | 70.87 |
| 9 | 0.200 | 10.08 | 50.40 |
| 10 | 0.214 | 10.23 | 47.80 |
| 11 | 0.204 | 10.00 | 49.02 |
| 12 | 0.219 | 7.85 | 35.84 |
| 13 | 0.220 | 7.19 | 32.68 |
| Average | 0.211 | 9.99 | 47.44 |
| Std. Dev. | 0.008 | 2.60 | 12.68 |
| Min. | 0.199 | 7.19 | 32.7 |
| Max. | 0.224 | 14.67 | 70.9 |

Use of the Pellets or the Granules or Pastilles as Flame Retardants

The pellets of this invention and the granules/pastilles produced pursuant to this invention can be used as flame retardants in a wide variety of thermoplastic polymers. Among such polymers are thermoplastic polyesters, such as polyethylene terephthalate, polybutylene terephthalate, polytrimethylene terephthalate, polycyclohexylene terephthalate, etc.; thermoplastic polyamides, such as nylon 6, nylon 6,6, nylon 6,12, etc.; polycarbonates; polyphenylene oxides, such as poly(2,6-dimethylphenylene oxide); polysulphones; polystyrene or other styrenic homopolymers; copolymers of two or more styrenic monomers such as copolymers of styrene, vinyltoluene, ethylstyrene, tert-butylstyrene, α-methylstyrene, vinylnaphthalene, etc.; rubber-modified vinylaromatic homopolymers or copolymers (e.g., high impact polystyrene); acrylate or methacrylate polymers such as ethylene-methylacrylate, ethylene-ethylacrylate, ethylene-butylacrylate, poly(methylmethacrylate), etc.; ethylene-vinylacetate copolymers; acrylonitrile-based copolymers and terpolymers such as acrylonitrile-butadiene-styrene (ABS) and styrene-acrylonitrile (SAN), etc.; polyolefins, such as polyethylene, polypropylene, poly-(1-butene), and copolymers of ethylene with one or more higher vinyl olefins such as propylene, 1-butene, 1-pentene, 1-hexene, 1-heptene, 1-octene; and blends, alloys, or composites of different polymers such as for example a blend of poly(2,6-dimethylphenylene oxide) and polystyrene, a blend of polycarbonate and polystyrene, and similar blends. Additional polymers that can be flame retarded by use therewith of pelletized flame retardant additives of this invention include rubbery block copolymers such as styrene-ethylene-ethylene-styrene, styrene-ethylene-propylene-styrene, styrene-ethylene-butylene-styrene, etc.; polyurethanes; epoxy resins; phenolic resins; elastomers such as natural rubber, butyl rubber, GRS, GRN, EPDM, etc; polysiloxanes; and the like. Further, the polymer may be, where appropriate, cross-linked by chemical means or by radiation. A large number of flame retardant-free polymers suitable for use in the practice of this invention can be obtained from a number of commercial sources.

A preferred group of substrate polymers that can be effectively flame retarded by use of the pellets of this invention are polyesters. Thermoplastic polyesters, often referred to as polyalkylene terephthalates, are reaction products of aromatic dicarboxylic acid or reactive derivatives thereof, such as methyl esters or anhydrides, and aliphatic, cycloaliphatic, or araliphatic diols, and mixtures of such reaction products. Examples of such thermoplastic polyesters include polyethylene terephthalate, polypropylene terephthalate, polybutylene terephthalate, polycyclohexylene dimethylene terephthalate, and related copolyesters and blends, including blends of one or more thermoplastic polyesters with one or more other thermoplastic polymers such as polycarbonates, and especially aromatic polycarbonates.

Preferred thermoplastic polyesters contain at least 80% by weight and preferably at least 90% by weight, based on the dicarboxylic acid component, of terephthalic acid and at least 80% by weight and preferably at least 90% by weight, based on the diol component, of ethylene glycol and/or 1,4-butanediol units.

In addition to terephthalic acid units, the preferred thermoplastic polyesters may contain up to 20 mole % and preferably up to 10 mole % of units of other aromatic or cycloaliphatic $C_{8-14}$ dicarboxylic acids or aliphatic $C_{4-12}$ dicarboxylic acids, such as, for example, units of phthalic acid, isophthalic acid, 2,6-naphthalene dicarboxylic acid, 4,4'-diphenyl dicarboxylic acid, succinic acid, adipic acid, sebacic acid, azelaic acid, or cyclohexane diacetic acid.

In addition to ethylene glycol and 1,4-butanediol units, the preferred thermoplastic polyesters may contain up to 20 mole % and preferably up to 10 mole % of other aliphatic $C_{3-12}$ diols or cycloaliphatic $C_{6-12}$ diols, such as, for example, units of 1,3-propanediol, 2-ethylpropane-1,3-diol, neopentyl glycol, 1,5-pentanediol, 1,6-hexanediol, 1,4-cyclohexanedimethanol, 3-ethylpentane-2,4-diol, 2-methylpentane-2,4-diol, 2,2,3-trimethylpentane-1,3-diol,2-ethylhexane-1,3-diol,2,2-diethylpropane-1,3-diol,2,5-hexanediol,2,2-bis(4-hydroxy-cyclohexyl)propane, 2,4-dihydroxy-1,1,3,3-tetramethylcyclobutane, 2,2-bis[4-(2-hydroxy-ethoxy)phenyl]propane, or 2,2-bis-[4-hydroxypropoxy)phenyl]propane.

Polyalkylene terephthalates may be branched by incorporation of relatively small quantities of trihydric or tetrahydric alcohols or tribasic or tetrabasic carboxylic acids. In this connection see, for example, U.S. Pat. No. 3,692,744. Examples of preferred branching agents are trimesic acid, trimellitic acid, trimethylol ethane and propane and pentaerythritol.

Particularly preferred thermoplastic polyesters are those produced solely from terephthalic acid or a reactive derivative thereof such as a dialkyl ester, and ethylene glycol and/or 1,4-butane diol, and mixtures of these polyalkylene terephthalates. Preferred polyalkylene terephthalate mixtures contain 1 to 50% by weight of polyethylene terephthalate and 99 to 50 wt % of polybutylene terephthalate. Particularly preferred mixtures contain 1 to 30 wt % of polyethylene terephthalate and 99 to 70% by weight of polybutylene terephthalate.

The polyalkylene terephthalates preferably used generally have an intrinsic viscosity of 0.4 to 1.5 dl/g, preferably 0.5 to 1.3 dl/g and more preferably 0.55 to 1.2 dl/g, as measured in phenol/o-dichlorobenzene (1:1 parts by weight) at 25° C. using an Ubbelohde viscosimeter. Polyethylene terephthalate and polybutylene terephthalate of these intrinsic viscosity ranges, and mixtures thereof, are most preferred. As is well known, polyethylene terephthalate engineering resin producers compound their products from either virgin PET (typically 0.55-0.70 IV) or reclaimed PET from industrial scrap, polyester film scrap, bottles and, rarely polyester fiber scrap.

Additional thermoplastic polyesters which may be utilized in the practice of this invention include, for example, polyetheresters, polyester-polycarbonate blends or alloys, polyester-ABS blends or alloys, polyester-MBS blends or alloys, and impact-modified thermoplastic polyesters.

Polyalkylene terephthalates may be produced by known methods. See, for example, *Encyclopedia of Polymer Science and Technology*, Vol. 11, pages 62-128, John Wiley & Sons, Inc., copyright 1969; and Kirk-Othmer, *Encyclopedia of Chemical Technology*, 4th Ed., Vol. 19, pages 609-653, John Wiley & Sons, Inc., copyright 1996.

Another group of preferred thermoplastic polymers which can be effectively flame retarded by use of the pellets of this invention are polyamides, which are sometimes referred to as nylon polymers. Such polyamide substrate polymer can be any amorphous and/or partly crystalline, predominately aliphatic/cycloaliphatic or partially aromatic thermoplastic polyamide. Typically such materials are produced by polycondensation and/or polymerization processes from diamines which are predominately or entirely aliphatic or cycloaliphatic in structure, or which are partially or entirely aromatic in structure, and carboxylic acids or lactams which are predominantly or entirely aliphatic or cycloaliphatic in structure, or which are partially or entirely aromatic in structure. Typical amines used in forming polyamides include such diamines as hexamethylenediamine, tetramethylenediamine, 2,2,4- and 2,4,4-trimethyl-hexamethylenediamine, diaminodicyclohexylmethane (isomers), diaminodicyclohexylpropane (isomers) and isophoronediamine (isomers), and xylylenediamine. Also used as source materials are aminocarboxylic acids such as ε-aminocaproic acid, or $\overline{\omega}$-aminocarboxylic acids such as $\overline{\omega}$-aminolauric acid and $\overline{\omega}$-aminoundecanoic acid. Typically, the carboxylic acid used are aliphatic or mixed aliphatic-aromatic dicarboxylic acids having less than 50% by weight aromatic constituents such as adipic acid, 2,2,4- and 2,4,4-trimethyladipic acid, azelaic acid, sebacic acid, decanedicarboxylic acid, dodecanedicarboxylic acid, cyclohexanedicarboxylic acid, hexahydroterephthalic acid, isophthalic acid and terephthalic acid.

Copolyamides from the majority of the known monomers can also be used.

Illustrative polyamides which may be used in the practice of this invention are such polyamides as nylon 6, nylon 6,6, nylon 6,9, nylon 6,10, nylon 6,12, nylon 11, nylon 12, nylon 12,12, nylon 6/6,6 copolymer, and high temperature nylons such as nylon 4,6, and partially aromatic nylons (e.g., Ixef polyarylamide PA MXD6 from Solvay, Zytel HTN from DuPont, and Amodel polyarylamide from Solvay). Other polyamides which may be used include Arlen modified polyamide 6T from Mitsui Chemicals, Inc., Genestar PA9T polyamide resin from Kuraray Company, Stanyl polyamide 46 from DSM, Vydyne polyamide 6/66 copolymers from Monsanto, polyamide 612 (Vestamid D from Creanova), and similar polyamides. Of the various nylon polymers, nylon 6 and nylon 6,6 are the preferred substrate polymers.

This invention is also applicable to thermoplastic blends or alloys of one or more polyamides such as, for example, polyamide-polyolefin blends or alloys, polyamide-ionomer blends or alloys, polyamide-ABS blends or alloys, polyamide-EPDM blends or alloys, polyamide-polyphenylene oxide blends or alloys, or impact-modified polyamides.

Methods for producing polyamide polymers are known and described in the literature. See, for example, *Encyclopedia of Polymer Science and Technology*, Vol. 10, pages 460-482, John Wiley & Sons, Inc., copyright 1969; and Kirk-Othmer, *Encyclopedia of Chemical Technology*, 4th Ed., Vol. 19, pages 559-584, John Wiley & Sons, Inc., copyright 1996.

The following example illustrates the practice and advantages of one embodiment this invention. This example is not intended to place limitations upon the generic scope of this invention.

EXAMPLE

The devolatilization extruder used in this operation was a Werner & Pfleiderer ZSK-30 30 mm co-rotating twinscrew extruder. The machine had a nine-barrel configuration with an L/D ratio of 27/1. A vent was located on barrel 4, and a vent for application of a 30-inch vacuum on barrel 8 was provided. A vacuum knockdown trap was provided to condense volatiles exiting from the vent in barrel 4. The machine was operated with the following temperature profile: Feed throat with cooling water ON, Zone 1 at 140° C., Zone 2 at 180° C., Zone 3 at 220° C., Zone 4 at 240° C. The die at the outlet was held at 230° C. The screw design provided a gentle kneading block section in barrels 5 and 6. Operating conditions were 125 rpm and 30% torque, with a melt temperature of 243° C. and a feed rate of an 83% solution of brominated anionic polystyrene (formed from SAYTEX® HP 3010, Albemarle Corporation) in bromochloromethane (BCM) of 8 kg/hr. Two strands were extruded onto a 5-foot long takeoff belt conveyor, and gravity fed to a open drum at the end of the belt. Samples were taken from the open drum. Because of a limited material quantity of brominated anionic polystyrene available for this operation, the machine was operated for about 8-10 minutes. The material ran smoothly during the operation. About 20-30 mL of BCM solvent was condensed in the vacuum knockdown trap. Dry ice and isopropyl alcohol were used to cool the vacuum trap, and this was adequate to condense the BCM even at the 30-inch Hg vacuum used. The conveyor belt was at about 2200 cubic feet per minute (ca. 62.3 cubic meters per minute) and the vacuum was applied directly to the proximate surface of the conveyor belt by two vacuum applicators disposed transverse to the belt with the mouth of each applicator having an area of 45 square inches (ca. 114.3 square centimeters).

To illustrate the improved strength properties achievable in pellets of this invention, there are shown in Table 2 crush strength data of pellets produced by devolatilization extrusion of a 60 wt % solution made from brominated anionic polystyrene powder SAYTEX® HP 3010, Albemarle Corporation) dissolved in bromochloromethane solvent (Pellets of This Invention) and of pellets produced not by devolatilization extrusion of the solution, but instead by extrusion of brominated anionic polystyrene powder (SAYTEX® HP 3010, Albemarle Corporation) as described in commonly-owned published PCT patent application WO 2005/118245 (Pellets Not of This Invention), pellets which are of good quality.

TABLE 2

| | Pellets of This Invention | | | | Pellets Not of This Invention | | |
|---|---|---|---|---|---|---|---|
| Sample | Length, inch | Peak Load, lbs. | Energy to Crush, lbs/in. | Sample | Length, inch | Peak Load, lbs. | Energy to Crush, lbs/in. |
| 1 | 0.190 | 4.44 | 23.37 | 1 | 0.143 | 5.06 | 35.38 |
| 2 | 0.257 | 6.40 | 24.90 | 2 | 0.206 | 5.44 | 26.41 |
| 3 | 0.182 | 7.79 | 42.80 | 3 | 0.194 | 2.63 | 13.56 |
| 4 | 0.304 | 8.68 | 28.55 | 4 | 0.185 | 5.93 | 32.05 |
| 5 | 0.323 | 8.28 | 25.63 | 5 | 0.229 | 14.37 | 62.75 |
| 6 | 0.323 | 5.51 | 17.06 | 6 | 0.210 | 5.84 | 27.81 |
| 7 | 0.280 | 9.74 | 34.79 | 7 | 0.178 | 6.73 | 37.81 |
| 8 | 0.153 | 10.02 | 65.49 | 8 | 0.191 | 4.32 | 22.62 |
| 9 | 0.258 | 9.80 | 37.98 | 9 | 0.273 | 4.91 | 17.99 |
| 10 | 0.254 | 8.58 | 33.78 | 10 | 0.295 | 4.45 | 15.08 |
| 11 | 0.285 | 9.54 | 33.47 | 11 | 0.354 | 4.34 | 12.26 |
| 12 | 0.386 | 10.75 | 27.85 | 12 | 0.329 | 3.47 | 10.55 |
| 13 | 0.473 | 12.25 | 25.90 | 13 | 0.415 | 5.34 | 12.87 |
| Average | 0.282 | 8.60 | 32.43 | Average | 0.246 | 5.60 | 25.16 |
| Std. Deviation | 0.086 | 2.16 | 12.04 | Std. Deviation | 0.081 | 2.84 | 14.60 | devolatilized pellets of unadulterated brominated anionic polystyrene produced had a nice appearance and had sufficient hardness to be placed into several storage containers, two of which were transported without noticeable pellet breakage.

The overall system utilized in the Example is schematically depicted in FIGS. 2 and 3. In such system, the following equipment was used:

a) The devolatilization extruder system 11 equipped and fitted, all as described in the Example.

b) Die 18 was a 2-hole die with holes of 4 mm diameter.

c) Conveyor belt 20 was a Scheer-Bay conveyor having a length of 14 feet (ca. 4.3 meters), a width of 15 inches (ca. 38.1 cm), and 3-inch (ca. 7.6-centimeter) diameter rollers. The mesh belt was upwardly inclined at an angle of about 12°.

d) Classifier 30 was a Witte model no 200 Classifier.

The vertical distance between the drop from the end of belt 20 to the top of classifier 30 was about 24 inches (ca. 61 cm), and the vertical distance between the end of transfer device 40 and the bottom of container 50 when empty was about 60 inches (ca. 152 cm). The conveyor traveled at a rate of 150 to 175 ft/min (ca. 45.7 to ca. 53.3 meters/minute. The water mist was fed at a rate of about one gallon per minute (ca. 3.79 liters/minute). The air knives were operated at a pressure of 10-25 psig and were disposed at about 5 inches (ca. 12.7 cm) above the surface of the conveyor belt. The vacuum applied beneath Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or other publication or published document referred to in any portion of this specification is incorporated in toto into this disclosure by reference, as if fully set forth herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

That which is claimed is:

1. A process for the preparation of a brominated styrenic polymer in the form of a melt or polymer flow, which process comprises:

brominating a styrenic polymer under superatmospheric pressure in a vaporizable solvent and in the presence of a Lewis acid bromination catalyst, and in a closed reaction system in which substantially all of the hydrogen halide coproduct is retained in the reaction mixture;

quenching the catalyst to thereby form (i) an organic phase containing dissolved brominated styrenic polymer and (ii) an aqueous phase containing hydrogen halide;

separating phases (i) and (ii) from each other, and if phase (i) has a viscosity less than extrudable viscosity, concentrating organic phase of (i) to form an admixture of extrudable viscosity;

continuously introducing organic phase of (i) or admixture of extrudable viscosity into the liquids inlet portion of an operating devolatilization extruder having a liquids inlet portion and a polymer melt or polymer flow outlet portion and at least two sections that can be operated (a) at temperatures that differ from each other, and (b) under pressures that differ from each other, one of the at least two sections being disposed upstream from the other of the at least two sections, the devolatilization extruder having vapor collecting apparatus adapted to collect volatiles formed in these at least two sections; and operating said section disposed downstream at higher temperature and lower pressure conditions than the temperature and pressure conditions of said section disposed upstream, so that (a) a flowable polymer melt or polymer flow of said polymer is formed within the devolatilization extruder and released from the at least one polymer melt or polymer flow outlet, and (b) volatiles composed predominately of the solvent released from the polymer in said at least two sections are collected by said vapor collecting apparatus, the polymer melt or polymer flow of such brominated styrenic polymer leaving from the outlet portion of the devolatilization extruder during steady-state operation of the devolatilization extruder containing an average of less than about 10,000 ppm (wt/wt) of the organic solvent used in the process.

2. A process as in claim 1 wherein the styrenic polymer that is to be brominated in the process is at least one anionic styrenic polymer having a GPC weight average molecular weight ($M_w$) in the range of about 2000 to about 200,000 and a GPC polydispersity in the range of 1 to about 2, wherein the brominated anionic styrenic polymer formed in said process has a bromine content of at least about 50 wt %.

3. A process as in claim 2 wherein said GPC weight average molecular weight ($M_w$) is in the range of about 3000 to about 10,000 and said bromine content is at least about 60 wt %.

4. A process as in claim 3 wherein said GPC weight average molecular weight ($M_w$) is in the range of about 3000 to about 7000 and said bromine content is at least about 67 wt %.

5. A process as in claim 1 wherein the styrenic polymer that is brominated in the process is at least one free-radically produced styrenic polymer having a GPC weight average molecular weight ($M_w$) in the range of about 30,000 to about 500,000 and a GPC polydispersity in the range of 1 to about 10, and wherein the brominated styrenic polymer formed in said process has a bromine content of at least about 50 wt %.

6. A process as in claim 5 wherein said GPC weight average molecular weight ($M_w$) is in the range of about 50,000 to about 300,000 and said bromine content is at least about 60 wt %.

7. A process as in claim 6 wherein said GPC weight average molecular weight ($M_w$) is in the range of about 150,000 to about 250,000 and said bromine content is at least about 67 wt %.

* * * * *